United States Patent
Wang et al.

(10) Patent No.: US 11,094,281 B2
(45) Date of Patent: Aug. 17, 2021

(54) SPLICED DISPLAY DEVICE, CONFIGURATION METHOD THEREOF, DISPLAY SERVER AND CONTROL METHOD THEREOF

(71) Applicants: BEIJING BOE DISPLAY TECHNOLOGY CO., LTD., Beijing (CN); BOE TECHNOLOGY GROUP CO., LTD., Beijing (CN)

(72) Inventors: Jianting Wang, Beijing (CN); Jinhui Cheng, Beijing (CN); Wei Zhang, Beijing (CN); Zhanchang Bu, Beijing (CN); Junning Su, Beijing (CN); Jianzi He, Beijing (CN); Rui Guo, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/642,666

(22) PCT Filed: Jun. 19, 2019

(86) PCT No.: PCT/CN2019/091893
§ 371 (c)(1),
(2) Date: Feb. 27, 2020

(87) PCT Pub. No.: WO2019/242643
PCT Pub. Date: Dec. 26, 2019

(65) Prior Publication Data
US 2020/0258471 A1    Aug. 13, 2020

(30) Foreign Application Priority Data
Jun. 22, 2018   (CN) .................. 201810654653.X

(51) Int. Cl.
*G09G 5/00*     (2006.01)
*G06F 3/14*     (2006.01)

(52) U.S. Cl.
CPC ........... *G09G 5/003* (2013.01); *G06F 3/1423* (2013.01); *G06F 3/1446* (2013.01);
(Continued)

(58) Field of Classification Search
CPC ................ G06F 3/1423; G06F 3/1446; G09G 2300/026; G09G 2356/00; G09G 2360/04; G09G 2370/022; G09G 2370/04
See application file for complete search history.

(56) References Cited

U.S. PATENT DOCUMENTS

| | | | |
|---|---|---|---|
| 5,767,818 A * | 6/1998 | Nishida | G09F 9/307 345/1.1 |
| 2014/0184472 A1 | 7/2014 | Xia et al. | |
| 2016/0110907 A1 * | 4/2016 | Kelly | A63F 13/25 345/473 |

FOREIGN PATENT DOCUMENTS

| | | |
|---|---|---|
| CN | 1499355 A | 5/2004 |
| CN | 1595488 A | 3/2005 |

(Continued)

OTHER PUBLICATIONS

Office Action dated Jan. 21, 2020 for application No. CN201810654653.X with English translation attached.
Office Action dated Sep. 1, 2020 for application No. CN201810654653.X with English translation attached.

*Primary Examiner* — Gene W Lee
(74) *Attorney, Agent, or Firm* — Nath, Goldberg & Meyer; Joshua R Goldberg

(57) ABSTRACT

A spliced display device and a configuration method thereof, and a display server and a control method thereof are provided. The configuration method may be applied to a spliced display device, and the spliced display device includes a plurality of displays spliced together in an array.

(Continued)

The configuration method includes: receiving display control information sent by a display server in a preset protocol format, wherein the display control information at least includes position setting information; and configuring the plurality of displays according to the display control information.

17 Claims, 10 Drawing Sheets

(52) U.S. Cl.
CPC ... *G09G 2300/026* (2013.01); *G09G 2356/00* (2013.01); *G09G 2360/04* (2013.01); *G09G 2370/022* (2013.01); *G09G 2370/04* (2013.01)

(56) References Cited

FOREIGN PATENT DOCUMENTS

| | | | |
|---|---|---|---|
| CN | 102097085 | A | 6/2011 |
| CN | 104484147 | A | 4/2015 |
| CN | 105808193 | A | 7/2016 |
| CN | 106415455 | A | 2/2017 |
| CN | 107274848 | A | 10/2017 |
| CN | 107633792 | A | 1/2018 |
| CN | 207268922 | U | 4/2018 |
| CN | 108829367 | A | 11/2018 |

\* cited by examiner

SPLICED DISPLAY DEVICE, CONFIGURATION METHOD THEREOF, DISPLAY SERVER AND CONTROL METHOD THEREOF

CROSS REFERENCE TO RELATED APPLICATIONS

This is a National Phase Application filed under 35 U.S.C. 371 as a national stage of PCT/CN2019/091893, filed Jun. 19, 2019, an application claiming the benefit of Chinese Application No. 201810654653.X, filed Jun. 22, 2018, the content of each of which is hereby incorporated by reference in its entirety.

TECHNICAL FIELD

The present disclosure relates to the field of display technology, and in particular to a spliced display device, a configuration method for a spliced display device, a display server, and a control method for a display server.

BACKGROUND

Currently, in the field of spliced display, when a spliced display device is to be used, it is difficult to predict how many displays (i.e., display apparatuses such as screens) are to be used in practical applications and the splicing order for the displays, due to differences between the practical applications, which results in the fact that it is difficult to configure a display device formed by splicing displays (i.e., display apparatuses such as screens) together (i.e., a spliced display device) in practical applications in advance. Therefore, it is desirable to be able to efficiently set up and debug a spliced display device.

SUMMARY

Embodiments of the present disclosure provide a spliced display device, a configuration method for a spliced display device, a display server, and a control method for a display server.

An aspect of the present disclosure provides a configuration method for a spliced display device, wherein the spliced display device includes a plurality of displays spliced together in an array, and the configuration method includes:

receiving display control information sent by a display server in a preset protocol format, wherein the display control information at least includes position setting information; and configuring the plurality of displays according to the display control information.

In an embodiment, the configuring the plurality of displays according to the display control information includes:

setting a display position of a start display of the plurality of displays according to the position setting information;

modifying the position setting information to obtain a next position setting information, and transmitting the next position setting information obtained by the modifying to a next display; and setting a display position of the next display according to the next position setting information.

In an embodiment, the configuring the plurality of displays according to the display control information further includes:

determining whether the next display is a last display; and in a case where it is determined that the next display is not the last display, performing the modifying the position setting information to obtain a next position setting information, and the transmitting the next position setting information obtained by the modifying to a next display; and the setting a display position of the next display according to the next position setting information, In an embodiment, the position setting information at least includes a first function identification parameter, a splicing number parameter and a connection position parameter;

the setting a display position of a start display of the plurality of displays according to the position setting information includes:

controlling the start display to be turned on and start to execute a display position transmission function, according to the first function identification parameter and the connection position parameter;

determining and storing a boundary parameter and a display scaling parameter of the array of the plurality of displays, according to the splicing number parameter;

storing the connection position parameter as a preset display position information of the start display;

determining and storing a display start position and a display end position of a display picture to be displayed by the start display, according to the connection position parameter; and controlling the start display to display the display picture, according to the display start position and the display end position of the display picture to be displayed by the start display.

In an embodiment, the modifying the position setting information to obtain a next position setting information includes:

modifying the connection position parameter to obtain a next connection position parameter, wherein the next position setting information includes the first function identification parameter, the splicing number parameter and the next connection position parameter;

the setting a display position of the next display according to the next position setting information includes:

controlling the next display to be turned on and start to execute a display position transmission function, according to the first function identification parameter and the next connection position parameter;

storing the next connection position parameter as a preset display position information of the next display;

determining and storing a display start position and a display end position of a display picture to be displayed by the next display, according to the next connection position parameter; and controlling the next display to display the display picture, according to the display start position and the display end position of the display picture to be displayed by the next display.

In an embodiment, the modifying the connection position parameter to obtain a next connection position parameter includes:

modifying the connection position parameter to obtain a to-be-determined parameter;

performing a boundary determination on the to-be-determined parameter according to the boundary parameter of the array of the plurality of displays;

in a case where the to-be-determined parameter is within a range of the boundary parameter, taking the to-be-determined parameter as the next connection position parameter; and in a case where the to-be-determined parameter is not within the range of the boundary parameter, remodifying the connection position parameter to obtain a to-be-determined parameter within the range of the boundary parameter, and taking the to-be-determined parameter obtained by the remodifying as the next connection position parameter.

In an embodiment, the connection position parameter includes a connection row coordinate value and a connection column coordinate value, and the boundary parameter includes a boundary row coordinate range and a boundary column coordinate range;

the modifying the connection position parameter to obtain a to-be-determined parameter includes:

adding 1 to one of the connection row coordinate value and the connection column coordinate value, or subtracting 1 from the one of the connection row coordinate value and the connection column coordinate value, to obtain a to-be-determined row coordinate value and a to-be-determined column coordinate value;

the performing a boundary determination on the to-be-determined parameter according to the boundary parameter of the array of the plurality of displays includes:

comparing the to-be-determined row coordinate value with the boundary row coordinate range, and comparing the to-be-determined column coordinate value with the boundary column coordinate range; in a case where the to-be-determined row coordinate value is within the boundary row coordinate range and the to-be-determined column coordinate range, determining the to-be-determined row coordinate value and the to-be-determined column coordinate value as the next connection position parameter; and in a case where the to-be-determined row coordinate value is not within the boundary row coordinate range and/or the to-be-determined column coordinate value is not within the boundary column coordinate range, adding 1 to the other of the connection row coordinate value and the connection column coordinate value, or subtracting 1 from the other of the connection row coordinate value and the connection column coordinate value, to obtain a to-be-determined row coordinate value within the boundary row coordinate range and a to-be-determined column coordinate value within the boundary column coordinate range, and taking the to-be-determined row coordinate value and the to-be-determined column coordinate value, which are obtained by remodifying, as the next connection position parameter.

In an embodiment, the display control information further includes display debugging information, the configuring the plurality of displays according to the display control information further includes:

performing display parameter debugging on a specified display of the plurality of displays according to the display debugging information and preset display position information of the displays.

In an embodiment, the display debugging information at least includes a second function identification parameter, a first debugging position parameter, a debugging display parameter and a first debugging connection position parameter; the preset display position information at least includes a display position parameter;

the performing display parameter debugging on a specified display of the plurality of displays according to the display debugging information and preset display position information of the displays includes;

transmitting the display debugging information to the start display of the plurality of displays according to the first debugging connection position parameter;

determining a display mode of the start display to be collaborative display or separate display and starting to execute a display parameter debugging function, according to the second function identification parameter;

comparing the first debugging position parameter with a preset display position parameter of the start display; in a case where the first debugging position parameter is the same as the preset display position parameter of the start display, determining the start display as the specified display;

in a case where the first debugging position parameter is different from the preset display position parameter of the start display, modifying the first debugging connection position parameter to obtain a next first debugging connection position parameter;

transmitting the display debugging information to a next display next to the start display according to the next first debugging connection position parameter; comparing the first debugging position parameter with a preset display position parameter of the next display, repeating this process until a display of which a preset display position parameter is the same as the first debugging position parameter is found out, and determining the display of which a preset display position parameter is the same as the first debugging position parameter as the specified display; and debugging the specified display of the plurality of displays according to the debugging display parameter.

In an embodiment, the configuration method further includes:

determining a display position serial number corresponding to each of the displays according to the preset display position information of the displays;

the display debugging information at least includes a second function identification parameter, a second debugging position parameter, a debugging display parameter and a second debugging connection position parameter;

the performing display parameter debugging on a specified display of the plurality of displays according to the display debugging information and preset display position information of the displays includes:

transmitting the display debugging information to the start display of the plurality of displays according to the second debugging connection position parameter;

determining a display mode of the start display to be collaborative display or separate display and starting to execute a display parameter debugging function, according to the second function identification parameter;

comparing the second debugging position parameter with the display position serial number corresponding to the start display; in a case where the second debugging position parameter is the same as the display position serial number corresponding to the start display, determining the start display as the specified display;

in a case where the second debugging position parameter is different from the display position serial number corresponding to the start display, modifying the second debugging connection position parameter to obtain a next second debugging connection position parameter;

transmitting the display debugging information to a next display next to the start display according to the next second debugging connection position parameter; comparing the second debugging position parameter with the display position serial number corresponding to the next display, repeating process until a display of which the display position serial number is the same as the second debugging position parameter is found out, and determining the display of which the display position serial number is the same as the second debugging position parameter as the specified display; and debugging the specified display of the plurality of displays according to the debugging display parameter.

In an embodiment, the debugging display parameter includes a display brightness parameter, a display contrast parameter, a display color saturation parameter, and a gain parameter and an offset parameter of pixels included in the specified display;

the debugging the specified display of the plurality of displays according to the debugging display parameter includes:

adjusting a display brightness of the specified display according to the display brightness parameter;

adjusting a display contrast of the specified display according to the display contrast parameter;

adjusting a display color saturation of the specified display according to the display color saturation parameter;

adjusting a gain of the pixels included in the specified display according to the gain parameter of the pixels included in the specified display; and adjusting an offset of the pixels included in the specified display according to the offset parameter of the pixels included in the specified display.

Another aspect of the present disclosure provides a control method for a display server, the control method including:

generating display control information in a preset protocol format, wherein the display control information at least includes position setting information; and transmitting the display control information to a spliced display device.

In an embodiment, the generating display control information in a preset protocol format includes:

setting a first function identification parameter, a splicing number parameter and a connection position parameter; and generating the position setting information according to the first function identification parameter, the splicing number parameter and the connection position parameter.

In an embodiment, the display control information further includes display debugging information, and the generating display control information in a preset protocol format includes;

setting a second function identification parameter, a first debugging position parameter, a debugging display parameter and a first debugging connection position parameter which are included in the display debugging information; and generating the display debugging information according to the second function identification parameter, the first debugging position parameter, the debugging display parameter and the first debugging connection position parameter.

In an embodiment, the display control information further includes display debugging information, and the generating display control information in a preset protocol format includes:

setting a second function identification parameter, a second debugging position parameter, a debugging display parameter and a second debugging connection position parameter which are included in the display debugging information; and generating the display debugging information according to the second function identification parameter, the second debugging position parameter, the debugging display parameter and the second debugging connection position parameter.

Another aspect of the present disclosure provides a spliced display device including a plurality of displays spliced together, the spliced display device further including;

a receiver configured to receive display control information sent by a display server in a preset protocol format, wherein the display control information at least includes position setting information; and a configurator configured to configure the plurality of displays according to the display control information.

Another aspect of the present disclosure provides a display server, including:

an information generator configured to generate display control information in a preset protocol format, wherein the display control information at least includes position setting information; and an information transmitter configured to transmit the display control information to a spliced display device.

Another aspect of the present disclosure provides a spliced display device, including a processor, a memory, and a computer program stored in the memory and executable by the processor, wherein the computer program, when being executed by the processor, implements the configuration method according to any of the foregoing embodiments of the present disclosure.

Another aspect of the present disclosure provides a display server, including a processor, a memory, and a computer program stored in the memory and executable by the processor, wherein the computer program, when being executed by the processor, implements the control method according to any one of the foregoing embodiments of the present disclosure.

Another aspect of the present disclosure provides a computer-readable storage medium, including a computer program stored therein, wherein the computer program, when being executed by a processor, carries out steps of the configuration method according to any one of the foregoing embodiments of the present disclosure or steps of the control method according to any one of the foregoing embodiments of the present disclosure.

BRIEF DESCRIPTION OF THE DRAWINGS

The accompanying drawings, which are included to provide a further understanding of the present disclosure, constitute a part of the present disclosure. The illustrative embodiments of the present disclosure and the description thereof are for explaining the present disclosure, but not intended to limit the present disclosure. In the drawings.

DETAILED DESCRIPTION

To further explain a spliced display device, a configuration method thereof, a display server and a control method thereof provided by embodiments of the present disclosure, exemplary embodiments will be described below in detail with reference to the accompanying drawings.

The inventors of the present inventive concept have found that the following first and second methods may be adopted to set up and debug a spliced display device.

In the first method, according to the requirements of a practical application, a manufacturer debugs displays in the factory, then numbers each of the displays, and then sends the displays to a user. Thereafter, the user splices the displays together according to their numbers. This method does not need on-site pre-debugging and can ensure the display effect, but has the disadvantages of long period, needing to be manufactured and debugged after determining the requirements of the practical application, and having a customization property. In addition, when the display which is subjected to abnormal damage (including transportation or installation damage) is replaced, factory data and information need to be checked and then a new display is ordered from the manufacturer. The manufacturer then sends the new display to the user for replacement, after manufacturing and debugging the new display. Thus, the operation and maintenance period is long and it is difficult to ensure that the performance parameters of the displays are consistent to each other.

In the second method, displays are spliced together on site of an application, and then splicing positions of the displays are determined by a dialing method, or positions of the displays are set through a factory menu by using a remote controller. In the method of determining the positions of the displays by the dialing method, the positions of the displays are obtained by reading position values on a DIP switch by software. This not only increases the cost of hardware, but also affects the reliability of the spliced display device. In addition, in the setting through a factory menu by using a remote controller, a remote control receiver needs to be externally connected to each of the displays, which results in a complex operation and many times of repeated debugging by debugging personnel.

Thus, the above two methods for setting up and debugging a spliced display device are complex to operate, inefficient, and of relatively poor accuracy. Therefore, it is desirable to efficiently set up and debug a spliced display device to meet the requirements of practical applications.

Figure 1:
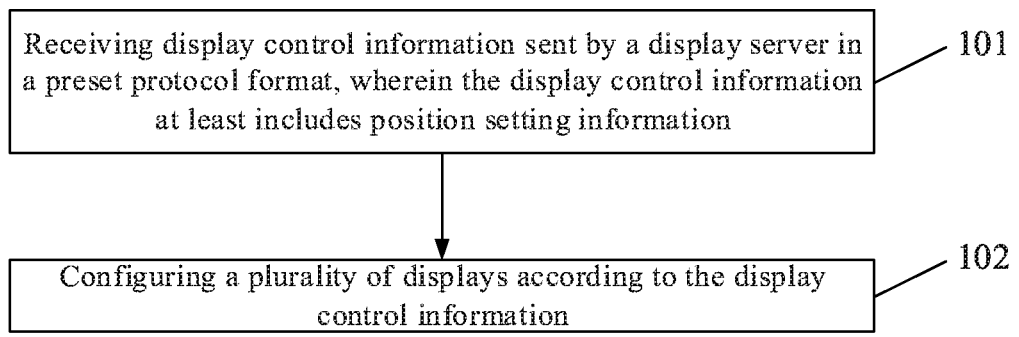
FIG. 1 is a schematic flowchart of a configuration method according to an embodiment of the present disclosure.

An embodiment of the present disclosure provides a configuration method, which may be applied to a spliced display device including a plurality of displays (i.e., display apparatuses such as screens) spliced together (e.g., in an array), as shown in FIG. 1, and the configuration method may include the following steps 101 and 102.

Step 101 may include receiving display control information sent by a display server in a preset protocol format, wherein the display control information at least includes position setting information.

Step 102 may include configuring a plurality of displays according to the display control information.

Specifically, splicing manners (or splicing modes) of the plurality of displays included in the spliced display device may be various. For example, the spliced display device may be formed by splicing the plurality of displays in a conventional cascade mode, or by splicing the plurality of displays in a mode of cascading (or connecting) with a network cable or a signal cable. When the plurality of displays are spliced together by using a conventional cascade mode, a specific cascade mode may be set according to the requirements of a practical application, and for example, may be one of a front-view normal Z-type cascade mode, a front-view reversed Z-type cascade mode, a front-view inverted Z-type cascade mode, a front-view normal W-type cascade mode, a front-view reversed W-type cascade mode, a front-view normal M-type cascade mode, and a front-view reversed M-type cascade mode as shown in FIGS. 6 to 13. Alternatively, a horizontal progressive row-by-row) scanning cascade mode, a vertical progressive (i.e., column-by-column) scanning cascade mode, or the like may be adopted.

Figure 6:
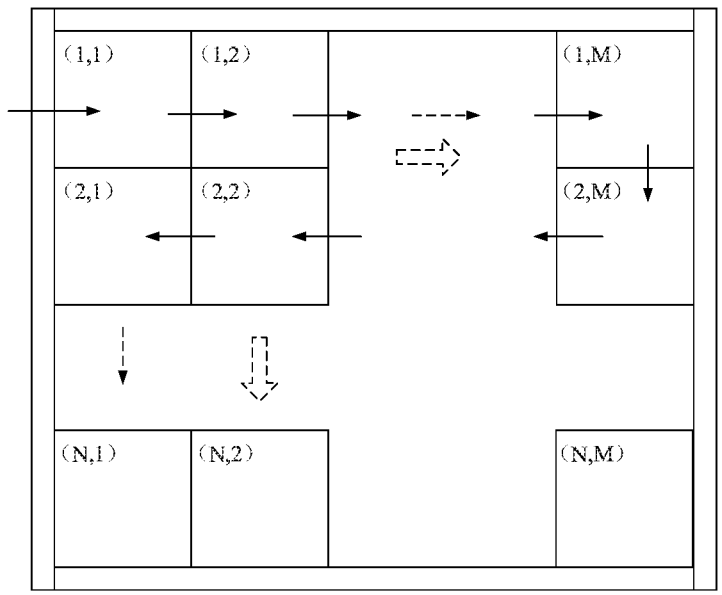
FIG. 6 is a schematic diagram showing a front-view normal Z-type cascade mode of a spliced display device according to an embodiment of the present disclosure.
Figure 7:
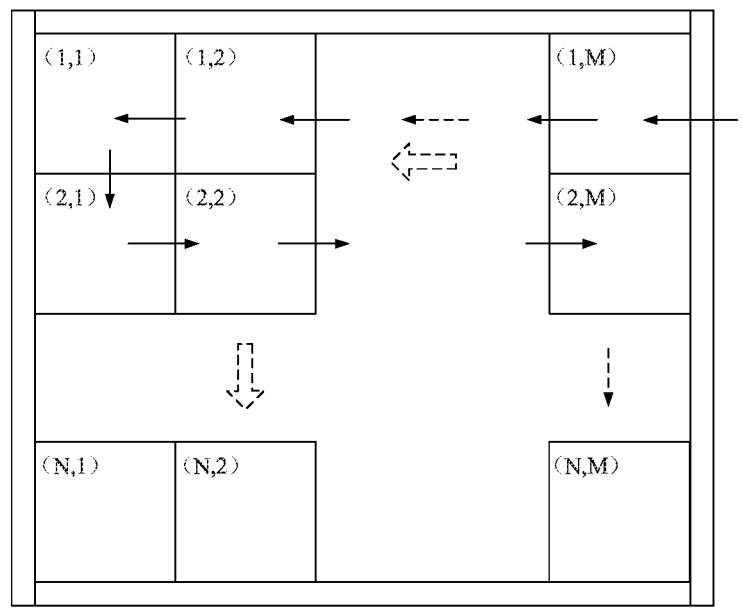
FIG. 7 is a schematic diagram showing a front-view reversed Z-type cascade mode of a spliced display device according to an embodiment of the present disclosure.
Figure 8:
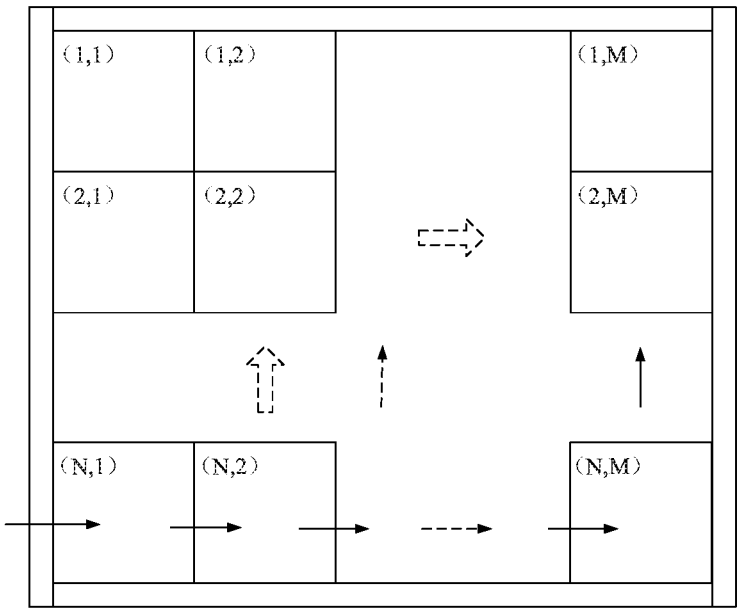
FIG. 8 is a first schematic diagram showing a front-view inverted. Z-type cascade mode of a spliced display device according to an embodiment of the present disclosure.
Figure 9:
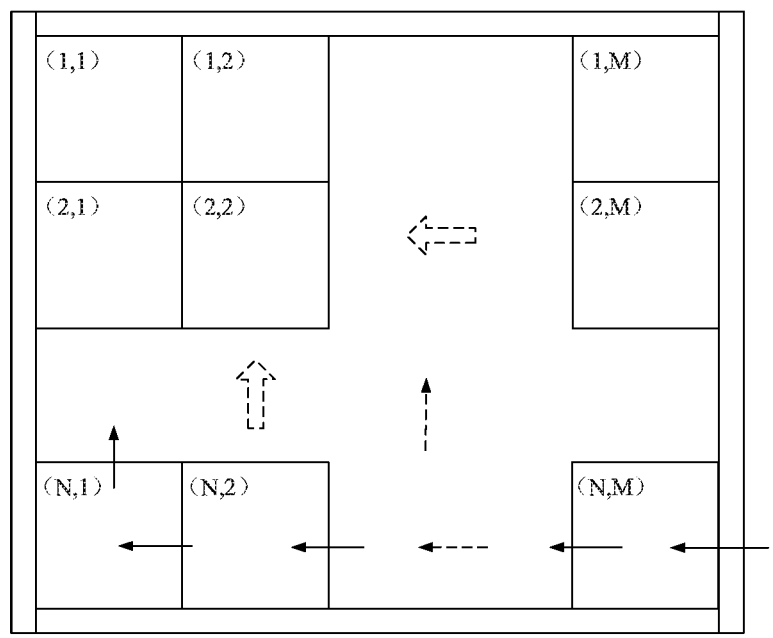
FIG. 9 is a second schematic diagram showing another front-view inverted Z-type cascade mode of a spliced display device according to an embodiment of the present disclosure.
Figure 10:
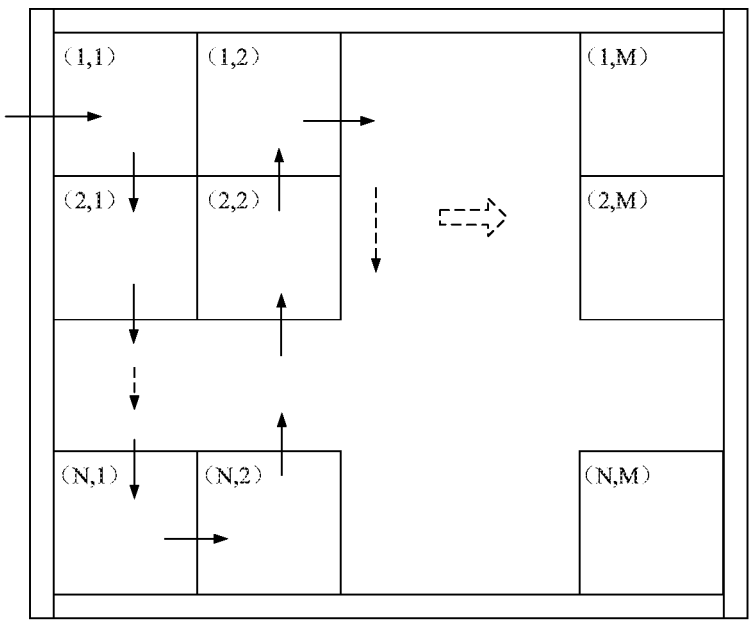
FIG. 10 is a schematic diagram showing a front-view normal W-type cascade mode of a spliced display device according to an embodiment of the present disclosure.
Figure 11:
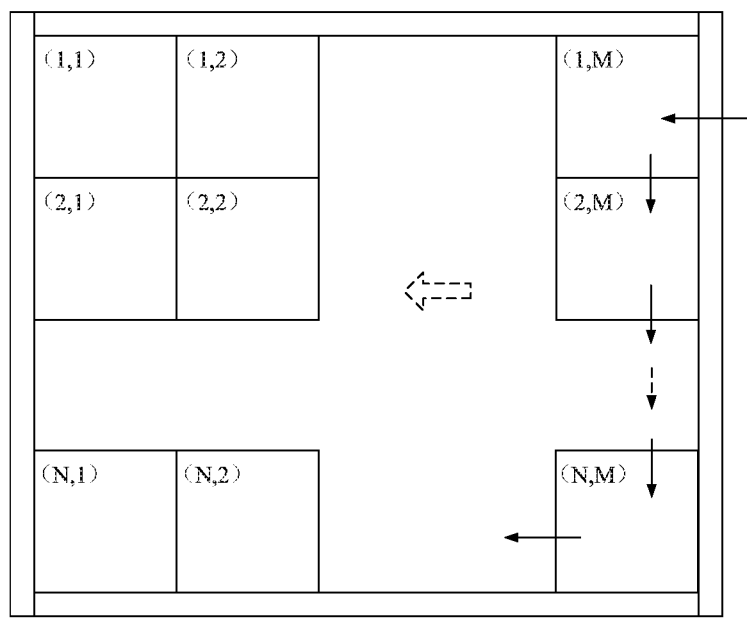
FIG. 11 is a schematic diagram showing a front-view reversed W-type cascade mode of a spliced display device according to an embodiment of the present disclosure.
Figure 12:
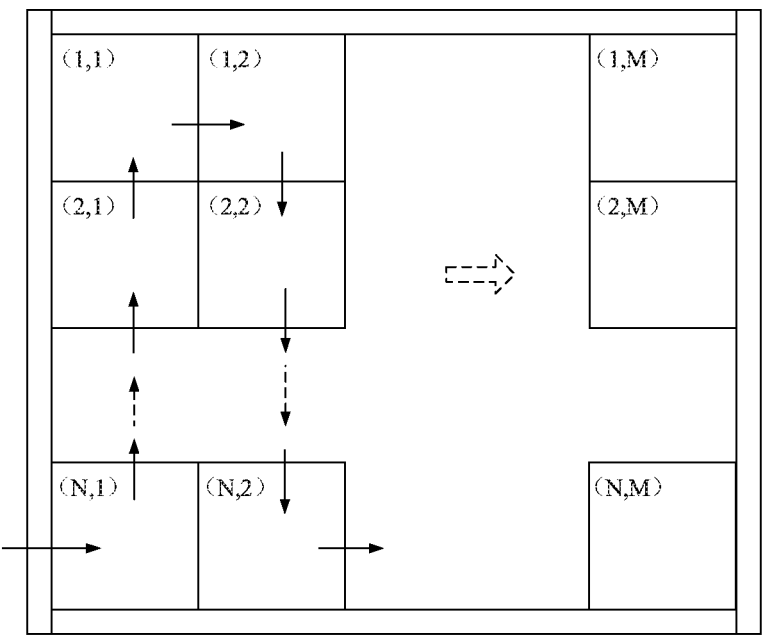
FIG. 12 is a schematic diagram showing a front-view normal M-type cascade mode of a spliced display device according to an embodiment of the present disclosure.
Figure 13:
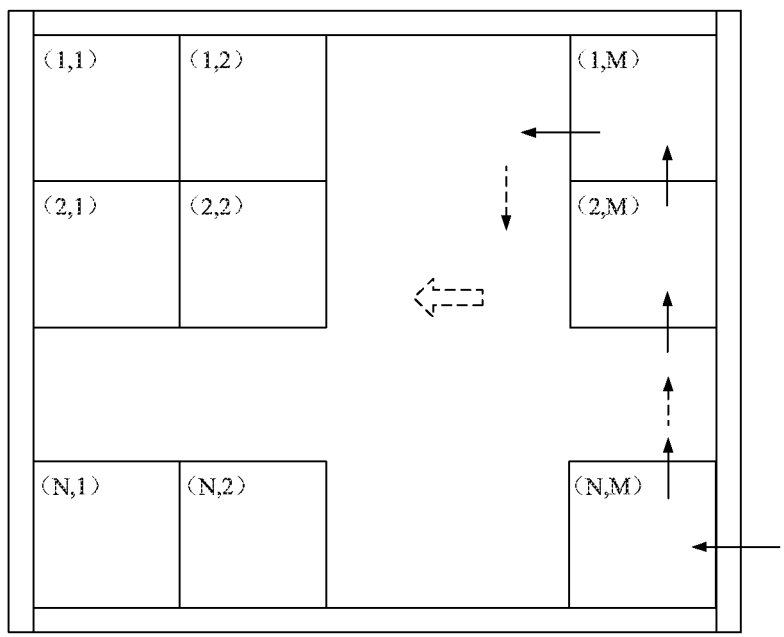
FIG. 13 is a schematic diagram showing a front-view reversed M-type cascade mode of a spliced display device according to an embodiment of the present disclosure.

For example, the front-view normal Z-type cascade mode shown in FIG. 6 means that, the plurality of displays are spliced together in an array (or a matrix) of N rows and M columns, have the display in the upper left corner (i.e., matrix element (1, 1)) (i.e., a first display) as a start display, are spliced together in the first row from left to right, are spliced together in the second row from right to left, are spliced together in the third row from left to right, . . . , until the connection of the last display (e.g., matrix element (N, M) in FIG. 6) is completed. The front-view reversed Z-type cascade mode shown in FIG. 7 means that, the plurality of displays are spliced together in an array (or matrix) of N rows and M columns, have the display in the upper right corner (i.e., matrix element (1, M)) (i.e., a first display) as a start display, are spliced together in the first row from right to left, are spliced together in the second row from left to right, are spliced together in the third row from right to left, . . . , until the connection of the last display (e.g., matrix element (N, M) in FIG. 7) is completed. The front-view inverted Z-type cascade mode shown in FIG. 8 means that, the plurality of displays are spliced together in an array (or matrix) of N rows and M columns, have the display in the lower left corner matrix element (N, 1)) (i.e., a first display)

as a start display, are spliced together in the N-th row from left to right, are spliced together in the (N−1)-th row from right to left, are spliced together in the (N−2)-th row from left to right, . . . , until the connection of the last display (e.g., matrix element (1, 1) in FIG. 8) is completed. Another front-view inverted Z-type cascade mode shown in FIG. 9 means that, the plurality of displays are spliced together in an array (or matrix) of N rows and M columns, have the display in the lower right corner (i.e., matrix element (N, M)) (i.e., a first display) as a start display, are spliced together in the N-th row from right to left, are spliced together in the (N−1)-th row from left to right, are spliced together in the (N−2)-th row from right to left, . . . , until the connection of the last display (e.g., matrix element (1, 1) in FIG. 9) is completed. The front-view normal W-type cascade mode shown in FIG. 10 means that, the plurality of displays are spliced together in an array (or matrix) of N rows and M columns, have the display in the upper left corner (i.e., matrix element (1, 1)) (i.e., a first display) as a start display, are spliced together in the first column from top to bottom, are spliced together in the second column from bottom to top, are spliced together in the third column from top to bottom, . . . , until the connection of the last display (e.g., matrix element (N, M) in FIG. 10) is completed. The front-view reversed W-type cascade mode shown in FIG. 11 means that, the plurality of displays are spliced together in an array (or matrix) of N rows and M columns, have the display in the upper right corner (i.e., matrix element (1, M)) (i.e., a first display) as a start display, are spliced together in the first column from top to bottom, are spliced together in the second column from bottom to top, are spliced together in the third column from top to bottom, . . . , until the connection of the last display (e.g., matrix element (1, 1) in FIG. 11) is completed. The front-view normal M-type cascade mode shown in FIG. 12 means that, the plurality of displays are spliced together in an array (or matrix) of N rows and M columns, have the display in the lower left corner (i.e., matrix element (N, 1)) (i.e., a first display) as a start display, are spliced together in the first column from bottom to top, are spliced together in the second column from top to bottom, are spliced together in the third column from bottom to top, . . . , until the connection of the last display (e.g., matrix element (N, M) in FIG. 12) is completed. The front-view reversed M-type cascade mode shown in FIG. 13 means that, the plurality of displays are spliced together in an array (or matrix) of N rows and M columns, have the display in the lower right corner (i.e., matrix element (N, M)) (i.e., a first display) as a start display, are spliced together in the first column from bottom to top, are spliced together in the second column from top to bottom, are spliced together in the third column from bottom to top, . . . , until the connection of the last display (e.g., matrix element (1, 1) in FIG. 13) is completed.

When the spliced display device is configured, the display control information sent by the display server in the preset protocol format is received at first, and the preset protocol format may be in various forms and may be set according to actual needs, as long as the requirement that a sending terminal (i.e., the display server) and a receiving terminal (i.e., the spliced display device) of the display control information can keep the protocol to be consistent is met. Therefore, the kinds of the received display control information may be various. For example, the display control information includes at least the position setting information. After the display control information is received, the plurality of displays of the spliced display device may be configured according to the display control information.

It should be noted that, the spliced display device may receive the display control information through a plurality of communication modes, for example, the display control information may be loaded through a network cable signal protocol, or may multiplex a control signal in a cascade video signal such as a DDC SCUDDC SDA signal in HDMI, DVI and VGA, or may be loaded through an external cascade control signal line (e.g., via a serial port).

When the plurality of displays of the spliced display device are configured, after the plurality of displays are spliced into the spliced display device according to a predetermined (e.g., specified in the display control information) cascade mode, by using the configuration method provided by the embodiment of the present disclosure, the display control information, which includes at least the position setting information, sent by the display server in the preset protocol format may be received first, and then the plurality of displays included in the spliced display device may be configured according to the display control information, wherein this configuration process at least includes setting positions of the plurality of displays. Thus, compared with the methods for setting up and debugging the spliced display device in the related art, the configuration method according to the embodiment of the present disclosure can configure the plurality of displays of the spliced display device conveniently and quickly, thereby configuring the plurality of displays of the spliced display device more efficiently, and saving manpower simultaneously.

Figure 2:
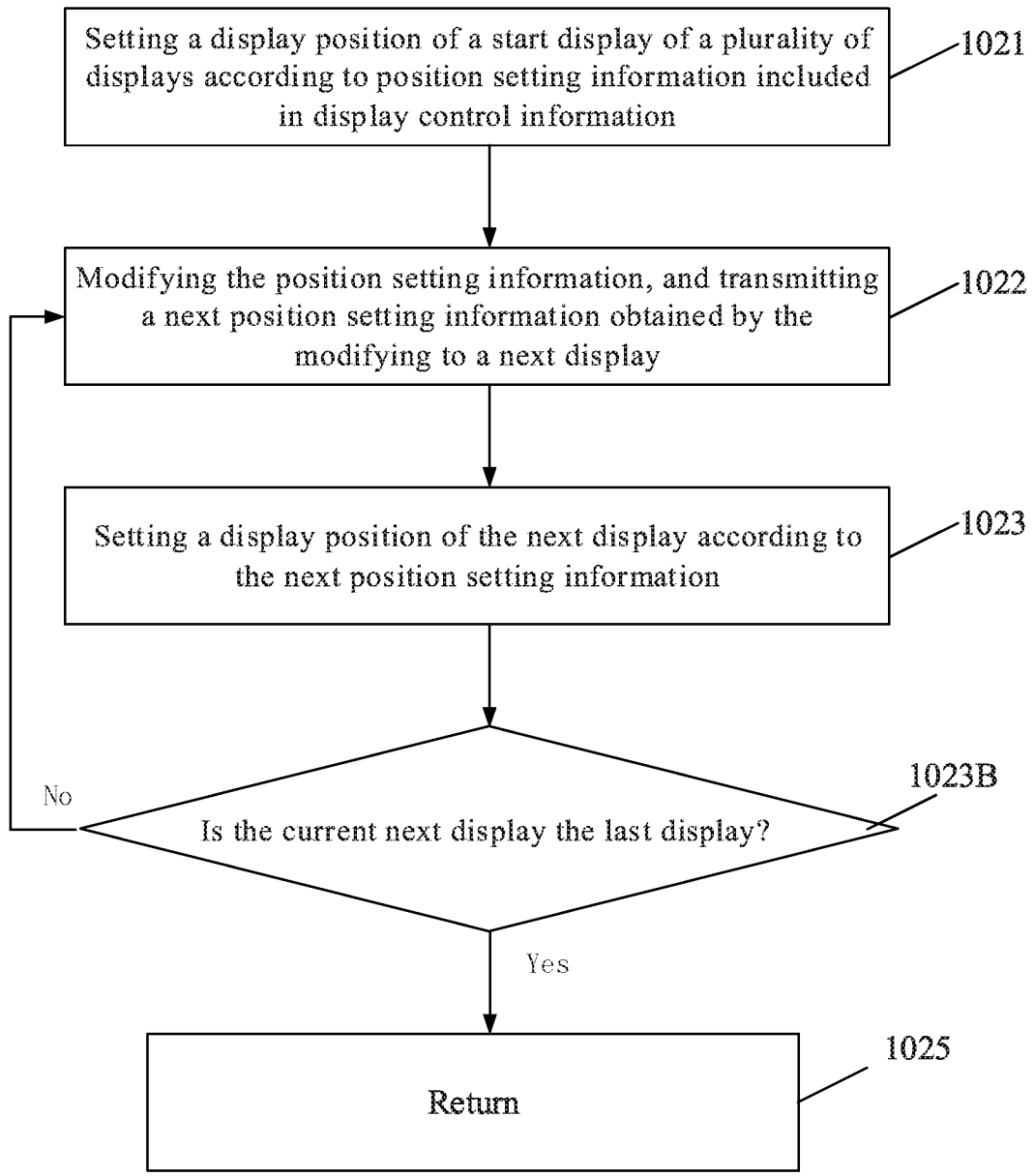
FIG. 2 is a schematic flowchart of setting of a display position of a display according to an embodiment of the present disclosure.

In an embodiment, as shown in FIG. 2, in the step 102, the configuring the plurality of displays spliced together in the spliced display device according to the display control information may include the following steps 1021 to 1023.

Step 1021 may include setting a display position of a start display of the plurality of displays according to the position setting information included in the display control information.

Specifically, in a case where the display control information received in step 101 includes the position setting information, the position setting information may be position setting information for the start display of the plurality of displays included in the spliced display device. When the plurality of displays of the spliced display device are configured, the display position of the start display of the plurality of displays may be set according to the position setting information.

It should be noted that, which display of the plurality of displays serves as the start display may be determined according to a predetermined cascade mode in a practical application. For example, when the plurality of displays are cascaded in the front-view normal Z-type cascade mode, the start display is the first display of the spliced display device located at the upper left corner (as shown by matrix element (1, 1) in FIG. 6), and when the plurality of displays are cascaded in the front-view reversed Z-type cascade mode, the start display is the first display of the spliced display device located at the upper right corner (as shown by matrix element (1, M) in FIG. 7).

Step 1022 may include modifying the position setting information to obtain next position setting information for a next display, and transmitting the next position setting information obtained by modification to the next display.

Specifically, after the display position of the start display is set, the position setting information may be modified according to a predetermined cascade mode to obtain next position setting information (which corresponds to the next display, among the plurality of displays, next to the start display), and then the modified next position setting information is transmitted to the next display which is next to the start display.

Step 1023 may include setting a display position of the next display according to the next position setting information, and repeating these two steps until a display position of the last display of the spliced display device is set. For example, after step 1023, step 102 may further include step 1023B. In step 1023B, it is determined whether the current next display is the last display. In a case where it is determined that the current next display is not the last display, the process returns to step 1022. In a case where it is determined that the current next display is the last display, the process proceeds to step 1025. Further, the process returns at step 1025, as shown in FIG. 2.

Specifically, after the next display receives the next position setting information, a display position of the next display may be set according to the next position setting information.

For ease of description, the next display which is next to the start display is defined as a second display, and the position setting information corresponding to the second display is defined as second position setting information. After a display position of the second display is set, the second position setting information may be continuously modified according to a preset cascade mode of the plurality of displays, to obtain third position setting information corresponding to a display (defined as a third display) next to the second display, and the third position setting information is transmitted to the third display. After the third display receives the third position setting information, a display position of the third display is set according to the third position setting information. This process may be repeated until a display position of the last display of the spliced display device is set.

From the process of configuring the plurality of displays spliced together in the spliced display device according to the display control information, it can be seen that in the configuration method provided by the foregoing embodiments of the present disclosure, after the display control information sent by the server is received, a display position of a start display of the spliced display device can be set according to the position setting information of the display control information, and then the position setting information is modified to obtain the next position setting information. Further, the next position setting information is transmitted to the next display, the next display may set a display position of the next display according to the next position setting information. This process may be repeated until display positions of all displays of the spliced display device are set. Therefore, the configuration method provided by the foregoing embodiments of the present disclosure can realize the full-automatic configuration of the displays of the spliced display device, is simple and rapid and saves manpower compared with the methods for setting up and debugging a spliced display device in the related art.

Figure 3:
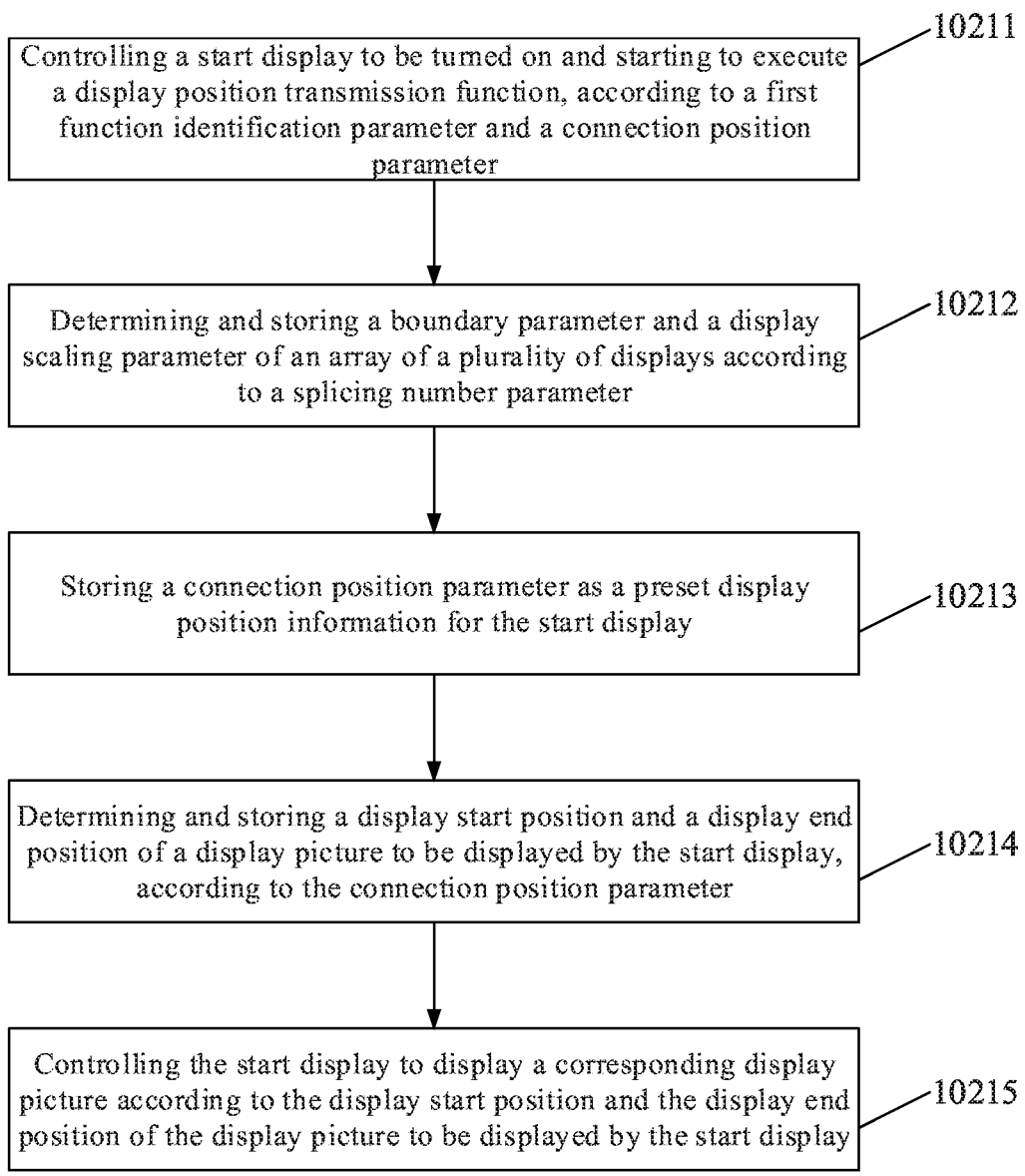
FIG. 3 is a schematic flowchart of setting of a display position of a start display according to an embodiment of the present disclosure.

In an embodiment, the position setting information at least includes a first function identification parameter, a splicing number parameter, and a connection position parameter. As shown in FIG. 3, the setting a display position of the start display of the plurality of displays according to the position setting information in the step 1021 may include the following steps 10211 to 10215.

Step 10211 may include controlling the start display to be turned on and starting to execute a display position transmission function, according to the first function identification parameter and the connection position parameter.

Specifically, after the position setting information is received, the position setting information is decoded to obtain the corresponding first function identification parameter, splicing number parameter and connection position parameter. For example, the first function identification parameter includes a turn-on control identifier and a display position transmission function execution identifier, the splicing number parameter includes the number of rows and the number of columns of the array of the plurality of displays included in the spliced display device, and the connection position parameter includes display position information to be preset for the start display. In more detail, step 10211 may include: determining the start display according to the connection position parameter, controlling the start display to be turned on according to the turn-on control identifier of the first function identification parameter, and controlling the start display to execute a display position transmission function according to the display position transmission function execution identifier of the first function identification parameter.

Step 10212 may include determining and storing a boundary parameter and a display scaling parameter of the array of the plurality of displays according to the splicing number parameter.

Specifically, the boundary parameter of the array of the plurality of displays (e.g., an upper limit of a row serial number and an upper limit of a column serial number of the array of the plurality of displays) of the spliced display device and the display scaling parameter (e.g., a ratio of a display size of a picture to an original size of the picture) when a picture is displayed by using the spliced display device are determined and stored, according to the number of rows and the number of columns of the array of the plurality of displays included in the spliced display device.

Step 10213 may include storing the connection position parameter as a preset display position information for the start display.

Specifically, the connection position parameter includes display position information to be preset for the start display, and therefore, after the connection position parameter is obtained by decoding, the connection position parameter may be stored as the preset display position information for the start display.

Step 10214 may include determining and storing a display start position and a display end position of a display picture to be displayed by the start display, according to the connection position parameter.

The plurality of displays included in the spliced display device may display a same picture or may display different pictures. When the spliced display device is used for displaying picture(s), the display start position and the display end position of a display picture to be displayed by each display may be determined according to the display position information corresponding to the plurality of displays included in the spliced display device, and the display start position and the display end position of the display picture to be displayed by the display may be stored.

Step 10215 may include controlling the start display to display the display picture to be displayed according to the display start position and the display end position of the display picture to be displayed by the start display.

Specifically, after the display start position and the display end position of the display picture to be displayed by the start display is determined, the start display may be controlled to display the corresponding display picture according to the display start position and the display end position of the display picture to be displayed by the start display.

In an embodiment, the modifying the position setting information to obtain a next position setting information in step 1022 of may include the following step 10221.

Step 10221 may include modifying the connection position parameter to obtain a next connection position parameter. For example, the next position setting information may include: a first function identification parameter, a splicing number parameter, and a next connection position parameter.

Specifically, after the display position of the start display is set, the connection position parameter corresponding to the start display is modified to obtain the next connection position parameter. The next connection position parameter obtained from the modifying, the above-described first function identification parameter, and the above-described splicing number parameter together form the next position setting information and are transmitted to the next display.

Figure 4:
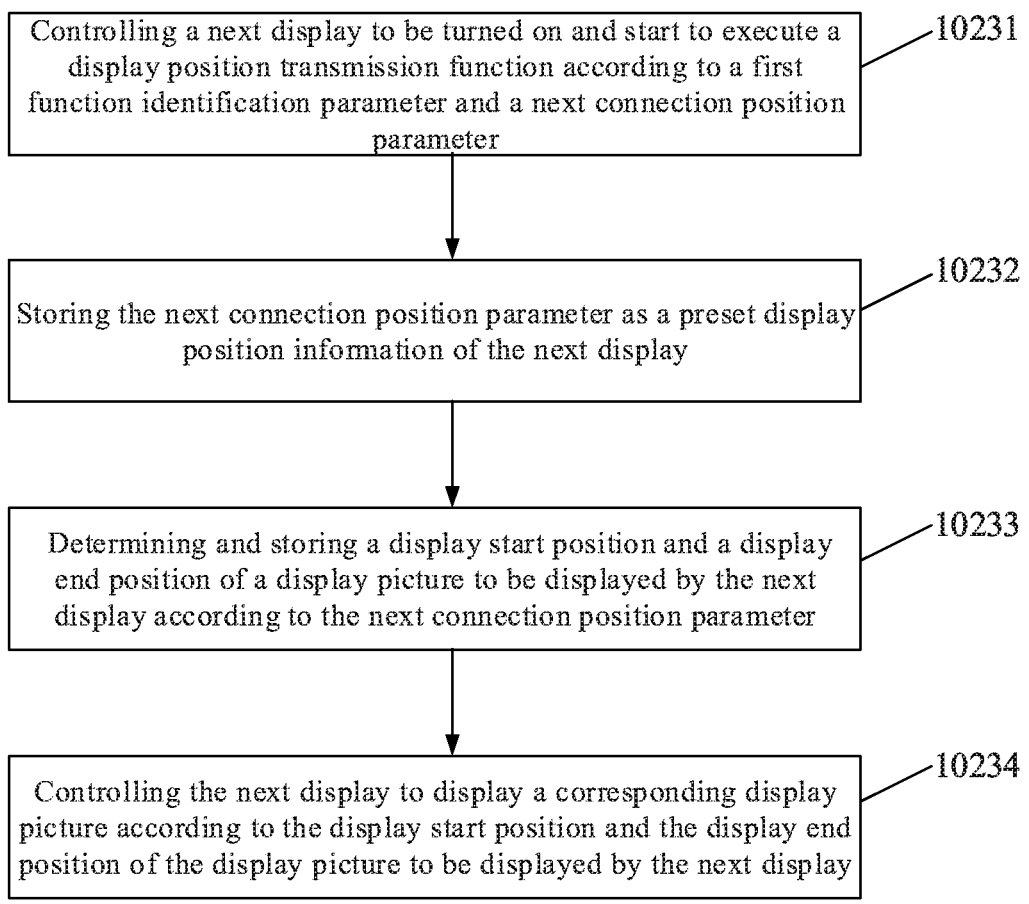
FIG. 4 is a schematic flowchart of setting a display position of a next display according to an embodiment of the present disclosure.

In an embodiment, as shown in FIG. 4, the setting a display position of the next display according to the next position setting information in step 1023 may include the following steps 10231 to 10234.

In step 10231, the next display is controlled to be turned on and start to execute a display position transmission function according to the first function identification parameter and the next connection position parameter.

Specifically, the next display is determined according to the next connection position parameter, the next display is controlled to be turned on according to the turn-on control identifier of the first function identification parameter, and the next display is controlled to execute the display position transmission function according to the display position transmission function execution identifier of the first function identification parameter.

In step 10232, the next connection position parameter is stored as a preset display position information of the next display.

Specifically, the next connection position parameter includes the display position information to be preset for the next display, and therefore, after the next connection position parameter is obtained by decoding, the next connection position parameter may be stored as the display position information preset for the next display.

In step 10233, a display start position and a display end position of a display picture to be displayed by the next display are determined and stored according to the next connection position parameter.

In step 10234, the next display is controlled to display the corresponding display picture according to the display start position and the display end position of the display picture to be displayed by the next display.

Specifically, after the display start position and the display end position of the display picture to be displayed by the next display are determined, the next display may be controlled to display the display picture to be displayed according to the display start position and the display end position of the display picture to be displayed by the next display.

From the process of setting the display positions of the plurality of displays of the spliced display device, it can be seen that in the configuration method provided by the foregoing embodiments of the present disclosure, the start display of the spliced display device may be controlled to be turned on first, and the position of the start display may be set. Then, the second display next to the start display may be controlled to be turned on, and the position of the second display may be set. This process may be repeated until the display positions of all the displays are set. Therefore, the configuration method provided by the foregoing embodiments of the present disclosure not only can conveniently and quickly set of the display positions of the displays of the spliced display device, but also can control the displays of the spliced display device to be sequentially turned on according to a cascade mode, thereby reducing a surge and an interference to the power grid, and avoiding influence on a public network effectively.

In an embodiment, in step 10221, modifying the connection position parameter to obtain a next connection position parameter may include the following steps:

Modifying the connection position parameters to obtain a to-be-determined parameter;

Performing boundary determination on the to-be-determined parameter, according to the boundary parameter of the array of the plurality of displays;

Taking the to-be-determined parameter as the next connection position parameter in a case where the to-be-determined parameter is within the range of the boundary parameter; and Remodifying the connection position parameter to obtain a to-be-determined parameter in the range of the boundary parameter in a case where the to-be-determined parameter is not within the range of the boundary parameter, and taking the to-be-determined parameter obtained by the remodifying as the next connection position parameter.

Specifically, when the connection position parameter is modified to obtain a next connection position parameter, the modified connection position parameter may exceed the boundary range of the plurality of displays. Thus, the connection position parameter may be modified to obtain a to-be-determined parameter, and then the to-be-determined parameter is subjected to boundary determination according to the boundary parameter of the array of the plurality of displays. In a case where the to-be-determined parameter is within the range of the boundary parameter, the to-be-determined parameter may be used as the next connection position parameter. In a case where the to-be-determined parameter is not within the range of the boundary parameter, the connection position parameter is remodified according to the cascade mode of the plurality of displays to obtain a to-be-determined parameter in the range of the boundary parameter, and the to-be-determined parameter obtained by the remodification may be adopted as the next connection position parameter.

In an embodiment, the connection position parameter includes a connection row coordinate value and a connection column coordinate value, and the boundary parameter includes a boundary row coordinate range and a boundary column coordinate range. The modifying the connection position parameter to obtain a to-be-determined parameter may include: adding one (1) to one of the connection row coordinate value and the connection column coordinate value, or subtracting one (1) from one of the connection row coordinate value and the connection column coordinate value, to obtain a to-be-determined row coordinate value and a to-be-determined column coordinate value.

The step of performing boundary determination on the to-be-determined parameter according to the boundary parameter of the array of the plurality of displays may include: comparing the to-be-determined row coordinate value with the boundary row coordinate range, and comparing the to-be-determined column coordinate value with the boundary column coordinate range; determining the to-be-determined row coordinate value and the to-be-determined column coordinate value as a next connection position parameter, in a case where the to-be-determined row coordinate value is within the boundary row coordinate range and the to-be-determined column coordinate value is within the boundary column coordinate range; otherwise, adding one (1) to the other of the connection row coordinate value and the connection column coordinate value or subtracting one (1) from the other of the connection row coordinate value and the connection column coordinate value, to obtain a to-be-determined row coordinate value within the boundary row coordinate range and a to-be-determined column coordinate value within the boundary column coordinate range, and taking the to-be-determined row coordinate value and the to-be-determined column coordinate value, which are obtained by the remodification, as a next connection position parameter.

The step of modifying the connection position parameter to obtain a next connection position parameter in step 10221 will be further described in detail below, by taking a case where the spliced display device includes the displays spliced together in M columns along the horizontal direction and in N rows along the vertical direction, and where the displays are cascaded together in the front-view normal Z-type cascade mode as an example.

As shown in FIG. 6, in the spliced display device, the connection row coordinate value and the connection column coordinate value of the connection position parameter corresponding to the start display are both 1, i.e., the connection position parameter corresponding to the start display is (1, 1). When the connection position parameter is modified, one (1) may be added to the connection column coordinate value of the connection position parameter according to the cascade mode, to obtain the to-be-determined row coordinate value of 1 and the to-be-determined column coordinate value of 2, i.e., the to-be-determined parameter is (1, 2). According to the fact that the spliced display device includes N×M displays, it can be known that the boundary row coordinate range of the spliced display device is 1 to N and the boundary column coordinate range thereof is 1 to M. Therefore, by comparing the to-be-determined row coordinate value 1 of the to-be-determined parameter (1, 2) with the boundary row coordinate range, and by comparing the to-be-determined column coordinate value 2 of the to-be-determined parameter (1, 2) with the boundary column coordinate range, it can be determined that the to-be-determined row coordinate value 1 is within the boundary row coordinate range of 1 to N and the to-be-determined column coordinate value 2 is within the boundary column coordinate range of 1 to M, thereby determining the to-be-determined row coordinate value 1 and the to-be-determined column coordinate value 2 as a next connection position parameter.

The above process for obtaining a next connection position parameter may be repeated similarly. When the resultant to-be-determined parameter is (1, M+1), it can be determined that a to-be-determined column coordinate value M+1 included in the to-be-determined parameter exceeds the corresponding boundary column coordinate range of 1 to M. In this case, the previous connection row coordinate value and the previous connection column coordinate value may be modified again to obtain a to-be-determined row coordinate value within the boundary row coordinate range and a to-be-determined column coordinate value within the boundary column coordinate range, i.e., (2, M), the parameter (2, M) may be determined as a next connection position parameter. This process may be repeated until a connection position parameter corresponding to each of the displays is determined.

It should be noted that, when each connection position parameter is determined, a determining step of determining whether the current to-be-determined parameter is an end position parameter, and if the current to-be-determined parameter is an end position parameter, the operation of setting a display position is ended. More specifically, by taking a case where the spliced display device includes N×M displays as an example again, the end position parameter may be (N, M+1) or (N+1, M), and if the resultant to-be-determined parameter is (N, M+1) or (N+1, M), the operation of setting a display position is ended.

In an embodiment, the display control information provided by the foregoing embodiments may further include display debugging information. In this case, the configuring the plurality of displays spliced together in the spliced display device according to the display control information in step 102 may further include step 1024 that is between step 1023 and step 1023B or between step 1023B and step 1025.

Step 1024 may include performing display parameter debugging on a specified display of the plurality of displays according to the display debugging information and the preset display position information for the displays.

Specifically, after the display positions of the displays are set, when the display parameter debugging are to be performed on the displays, the received display debugging information may be compared with the display position information corresponding to the displays, so as to determine the specified display corresponding to the display debugging information among the plurality of displays, and the display parameter debugging is performed on the determined specified display according to the display debugging information.

In the configuration method provided by the foregoing embodiments of the present disclosure, the display parameter debugging is performed on the specified display among the plurality of displays, by receiving the display debugging information and according to the display debugging information and the display position information preset for the displays. In this way, the display parameter debugging can be performed on each of the displays according to actual requirements to make display parameters of adjacent displays be close to each other, thereby causing display brightness and display color of the spliced display device to be consistent, and ensuring that the spliced display device has an excellent display effect of picture. Further, the display parameter debugging to be performed on each display is convenient and fast, and the debugging of the spliced display device is efficient.

Figure 5:
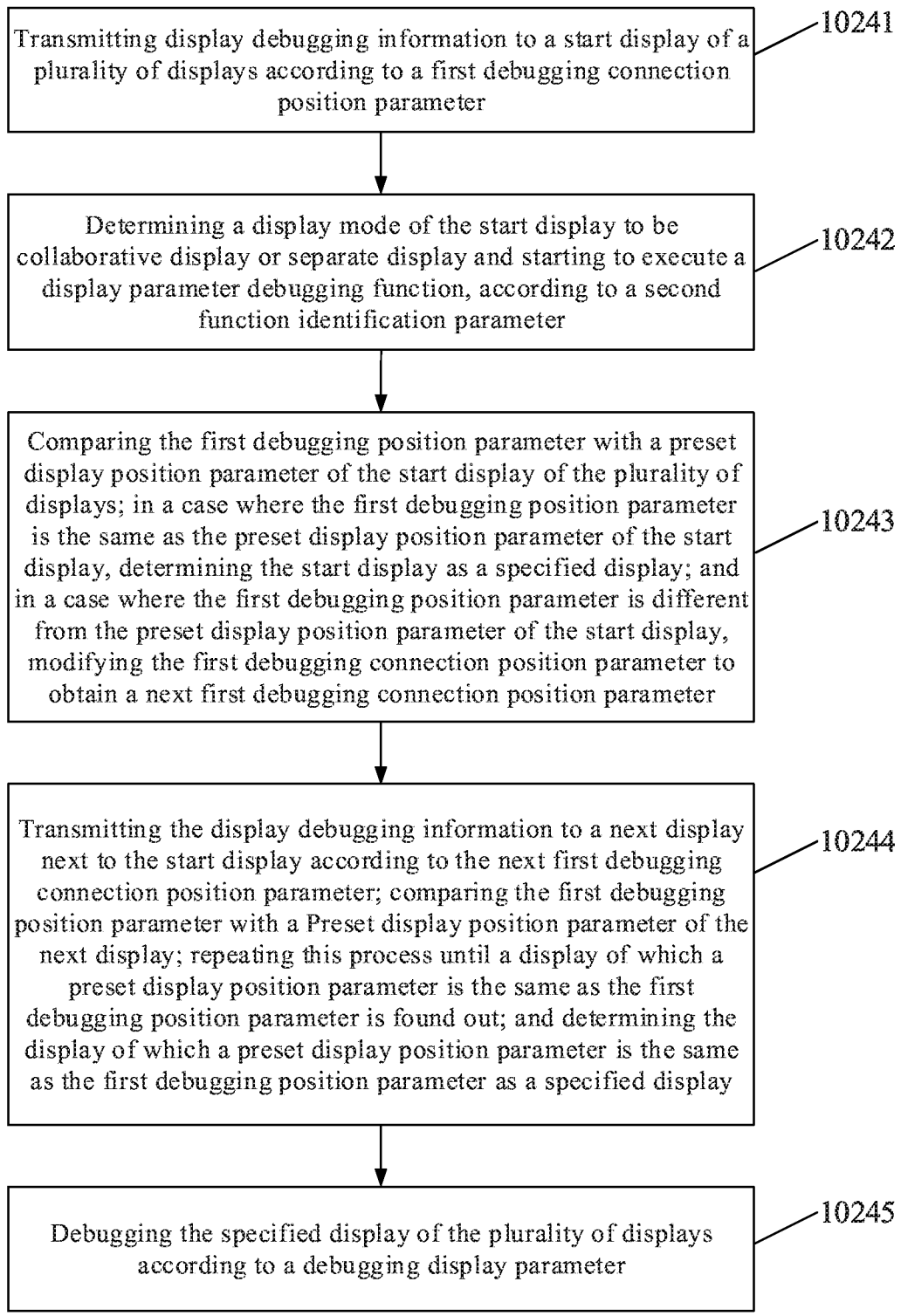
FIG. 5 is a schematic flowchart of debugging a specified display according to an embodiment of the present disclosure.

In an embodiment, the display debugging information at least includes a second function identification parameter, a first debugging position parameter, a debugging display parameter and a first debugging connection position parameter, and the preset display position information at least includes a display position parameter. As shown in FIG. 5, the performing display parameter debugging on a specified display among the plurality of displays according to the display debugging information and the preset display position information of the displays in step 1024 may include the following steps 10241 to 10245.

Step 10241 may include transmitting the display debugging information to the start display of the plurality of displays according to the first debugging connection position parameter.

Specifically, after the display debugging information is received, the display debugging information is decoded to obtain the corresponding second function identification parameter, first debugging position parameter, debugging display parameter, and first debugging connection position parameter. For example, the first debugging connection position parameter may represent a position parameter of a display (which is generally the start display) to which the display debugging information is first input when performing a debugging operation, and the first debugging connection position parameter may generally correspond to the display position parameter preset for the start display, but is not limited thereto.

Step 10242 may include determining a display mode of the start display to be collaborative display or separate display and starting to execute a display parameter debugging function, according to the second function identification parameter.

Specifically, the second function identification parameter includes a display mode identifier and a display parameter debugging function execution identifier. The display mode identifier indicates that a display mode in which the spliced display device display picture(s) is the collaborative display or the separate display. The collaborative display (i.e., splicing display) means that at least two displays of the spliced display device display one picture together, and the separate display means that each of the plurality of displays of the spliced display device displays a separate picture. The display parameter debugging function execution identifier indicates that a display parameter debugging function is to be performed on display(s) of the spliced display device.

In more detail, when the second function identification parameter is obtained through decoding, the display mode of the spliced display device is determined to be the collatorative display or the separate display according to the display mode identifier of the second function identification parameter, and the spliced display device is determined to start executing the display parameter debugging function on the display(s) of the spliced display device according to the display parameter debugging function execution identifier of the second function identification parameter.

Step 10243 may include: comparing the first debugging position parameter with the display position parameter preset for the start display of the plurality of displays; in a case where the first debugging position parameter is the same as the display position parameter preset for the start display, determining the start display as a specified display; and in a case where the first debugging position parameter is different from the display position parameter preset for the start display, modifying the first debugging connection position parameter to obtain a next first debugging connection position parameter.

Specifically, the first debugging position parameter obtained by decoding the display debugging information indicates a position parameter of a specified display, on which the display parameter debugging function needs to be performed, of the spliced display device. After the first debugging position parameter is obtained, the first debugging position parameter is compared with the display position parameter preset for the start display of the spliced display device, in a case where the first debugging position parameter is the same as the display position parameter preset for the start display, it shows that the start display is the specified display on which the display parameter debugging function needs to be performed, and at this time, the start display can be determined to be the specified display. In a case where the first debugging position parameter is different from the display position parameter preset for the start display, it shows that the start display is not the specified display on which the display parameter debugging function needs to be performed, and at this time, the first debugging connection position parameter may be modified to obtain the next first debugging connection position parameter, and the next first debugging connection position parameter may generally correspond to a display position parameter preset for a next display next to the start display, but is not limited thereto.

Step 10244 may include: transmitting the display debugging information to the next display next to the start display according to the next first debugging connection position parameter; comparing the first debugging position parameter with a display position parameter preset for the next display; repeating these steps until a display of which the preset display position parameter is the same as the first debugging position parameter is found out; and determining the display of which the preset display position parameter is the same as the first debugging position parameter as a specified display.

Specifically, after receiving the first debugging position parameter, the next display compares the first debugging position parameter with the preset display position parameter of the next display. In a case where the first debugging position parameter is the same as the preset display position parameter of the next display, the next display is determined to be the specified display. Otherwise, the display debugging information is further transmitted to a display next to the next display, and the above process is repeated in the same way until the specified display is determined from the spliced display device.

It should be noted that the first debugging position parameter may be position coordinates of the display to be debugged, and the display position parameter of each display may be position coordinates of the display. As such, when a specified display is to be determined, the position coordinates of the display to be debugged may be compared with the position coordinates of the displays in the order in which the displays are spliced together, and the specified display of the plurality of displays may be determined.

Step 10245 may include debugging the specified display of the plurality of displays according to the debugging display parameter.

Specifically, the debugging display parameter obtained by decoding the display debugging information represents a display parameter for debugging the specified display, and after the specified display is determined, the display parameter of the specified display may be adjusted according to the debugging display parameter.

In an embodiment, the configuration method provided by the above embodiments of the present disclosure may further include: determining a display position serial number corresponding to each display according to the preset display position information of the display.

Specifically, the plurality of displays included in the spliced display device may be numbered in sequence according to display position information preset for the respective displays, and each of the displays may have a corresponding display position serial number. For example, a display position serial number of the start display may be set to 1, a display position serial number of a next display next to the start display may be set to the display position serial number of the start display plus 1, i.e., the display position serial number of the next display may be set to 2, and so on, display position serial numbers of all the displays of the spliced display device may be determined. For example, in the array (e.g., matrix) of N rows and M columns of displays, a display position serial number of the last display may be N×M. However, the present disclosure is not limited thereto, and for example, display position serial numbers of the respective displays may be referred to the foregoing description of FIGS. 6 to 13.

In an embodiment, the display debugging information at least includes: the second function identification parameter, a second debugging position parameter, the debugging display parameter, and the second debugging connection position parameter. The performing display parameter debugging on a specified display of the plurality of displays according to the display debugging information and the preset display position information for the displays in step 1024 may include the following steps 10241' to 10245'.

Step 10241' may include transmitting the display debugging information to the start display of the plurality of displays according to the second debugging connection position parameter.

Specifically, after the display debugging information is received, the display debugging information is decoded to obtain the corresponding second function identification parameter, second debugging position parameter, debugging display parameter, and second debugging connection position parameter. For example, the second debugging connection position parameter represents a position parameter of a display (which is generally the start display) to which the display debugging information is first input when performing a debugging operation, and the second debugging connection position parameter may generally correspond to a display position serial number set for the start display, but is not limited thereto.

Step 1024T may include determining a display mode of the start display to be collaborative display or separate display and starting to execute a display parameter debugging function, according to the second function identification parameter.

Specifically, detailed description of step 10242' may be referred to the description of step 10242, and is omitted here.

Step 10243' may include: comparing the second debugging position parameter with the display position serial number corresponding to the start display; in a case where the second debugging position parameter is the same as the display position serial number corresponding to the start display, determining the start display as a specified display; and in a case where the second debugging position parameter is different from the display position serial number corresponding to the start display, modifying the second debugging connection position parameter to obtain a next second debugging connection position parameter.

Specifically, after the second debugging position parameter is obtained, the second debugging position parameter is compared with the display position serial number of the start display of the spliced display device. In a case where the second debugging position parameter is the same as the display position serial number of the start display, it shows that the start display is the specified display to which display parameter debugging needs to be performed, and at this time, the start display may be determined to be the specified display. In a case where the second debugging position parameter is different from the display position serial number of the start display, it shows that the start display is not the specified display to which display parameter debugging needs to be performed, at this time, the second debugging connection position parameter may be modified to obtain a next second debugging connection position parameter, and the next second debugging connection position parameter may generally correspond to a display position serial number set for a next display next to the start display, but is not limited thereto.

It should be note that, the second debugging position parameter obtained by decoding the display debugging information represents a position parameter of a specified display, to which display parameter debugging needs to be performed, of the spliced display device, and the position parameter may be the display position serial number of the display to be debugged. As such, when a specified display is to be determined, the display position serial number of the display to be debugged may be compared with the display position serial numbers of the displays in the order in which the displays are spliced together, and the specified display of the plurality of displays may be determined.

Step 10244' may include: transmitting the display debugging information to the next display next to the start display according to the next second debugging connection position parameter; comparing the second debugging position parameter with the display position serial number corresponding to the next display; repeating these steps until a display of which a display position serial number is the same as the second debugging position parameter is found out; and determining the display of which the display position serial number is the same as the second debugging position parameter as a specified display.

Specifically, after receiving the second debugging position parameter, the next display compares the second debugging position parameter with the display position serial number of the next display. In a case where the second debugging position parameter is the same as the display position serial number of the next display, the next display is determined to be the specified display. Otherwise, the display debugging information is further transmitted to a display next to the next display, and the above process may be repeated until the specified display is determined from the spliced display device.

Step 10245' may include debugging the specified display of the plurality of displays according to the debugging display parameter.

Specifically, the debugging display parameter obtained by decoding the display debugging information represents a display parameter for debugging the specified display, and after the specified display is determined, the display parameter of the specified display may be adjusted according to the debugging display parameter.

In an embodiment, the debugging display parameter at least includes a display brightness parameter, a display contrast parameter, a display color saturation parameter, and a gain parameter and an offset parameter pixels included in a specified display. The debugging the specific display of the plurality of displays according to the debugging display parameter in step 10245 may include the following steps:

adjusting a display brightness of the specified display according to the display brightness parameter;

adjusting a display contrast of the specified display according to the display contrast parameter;

adjusting a display color saturation of the specified display according to the display color saturation parameter;

adjusting a gain of the pixels included in the specified display according to the gain parameter of the pixels included in the specified display; and adjusting an offset of the pixels included in the specified display according to the offset parameter of the pixels included in the specified display.

For example, the pixels included in the specified display may include a red pixel, a green pixel, and a blue pixel. The gain parameter and the offset parameter of the pixels may include a gain parameter of the red pixel, an offset parameter of the red pixel, a gain parameter of the green pixel, an offset parameter of the green pixel, a gain parameter of the blue pixel, and an offset parameter of the blue pixel.

An embodiment of the present disclosure provides a control method, which may be applied to a display server, and may include the following steps:

generating display control information in a preset protocol format, wherein the display control information includes at least position setting information; and sending the display control information to the spliced display device.

Specifically, the preset protocol format may have various forms, and may be set according to actual requirements, as long as the requirement that a sending terminal (i.e., the display server) and a receiving terminal (i.e., the spliced display device) of the display control information can keep the protocol to be consistent is met. The display control information generated in the preset protocol format may include a plurality of types of information. For example, the display control information includes at least position setting information, and the position setting information is mainly used for setting a display position of the start display of the spliced display device.

It should be noted that, after the display control information is generated in the preset protocol format, the display server may send the display control information to the spliced display device in various communication manners, for example, the display control information is loaded through a network cable signal protocol; or control signals in the cascade video signals are multiplexed, such as DDC SCL/DDC SDA signals in HDMI, DVI and VGA; or the display control information is loaded through an external cascade control signal line (such as via a serial port).

In the control method provided by the present embodiment of the present disclosure, the display control information is generated in the preset protocol format, and then is sent to the spliced display device. After receiving the display control information, the spliced display device can configure the plurality of displays included in the spliced display device according to the display control information. Further, since the display control information at least includes position setting information, the spliced display device can set positions of the plurality of displays according to the position setting information. Therefore, in the control method provided by the present embodiment of the present disclosure, the display control information can be sent to the spliced display device in the preset protocol format, such that the spliced display device can perform convenient and efficient configuration on the displays according to the preset protocol format, In an embodiment, the generating the display controlation in the preset protocol format may include the following steps:

setting a first function identification parameter, a splicing number parameter, and a connection position parameter; and generating position setting information according to the first function identification parameter, the splicing number parameter, and the connection position parameter.

Specifically, the first function identification parameter includes the turn-on control identifier and a display position transmission function execution identifier, the splicing number parameter includes the number of rows and the number of columns of the array of the plurality of displays included in the spliced display device, and the connection position parameter includes the display position information preset for the start display of the spliced display device. After the first function identification parameter, the splicing number parameter and the connection position parameter are set, the first function identification parameter, the splicing number parameter and the connection position parameter are coded according to the preset protocol format to generate position setting information.

In an embodiment, the display control information further includes the display debugging information, and the generating the display control information in the preset protocol format further includes the following steps:

setting the second function identification parameter, the first debugging position parameter, the debugging display parameter and the first debugging connection position parameter; and generating the display debugging information according to the second function identification parameter, the first debugging position parameter, the debugging display parameter and the first debugging connection position parameter.

In an embodiment, the display control information further includes display debugging information, and the generating the display control information in the preset protocol format further includes the following steps:

setting a second function identification parameter, a second debugging position parameter, a debugging display parameter, and a second debugging connection position parameter; and generating the display debugging information according to the second function identification parameter, the second debugging position parameter, the debugging display parameter, and the second debugging connection position parameter.

Specifically, the second function identification parameter includes a display mode identifier and a display parameter debugging function execution identifier, and the display mode identifier indicates that a mode in which the spliced display device displays picture(s) is collaborative display or separate display. The display parameter debugging function execution identifier indicates that a display parameter debugging function to be performed on display(s) of the spliced display device. Each of the first debugging position parameter and the second debugging position parameter represents a position parameter of a specified display, on which display parameter debugging needs to be performed, of the spliced display device, and for example, the first debugging position parameter may be position coordinates, and the second debugging position parameter may be a display position serial number. Each of the first debugging connection position parameter and the second debugging connection position parameter represents a position parameter of a display (which is generally the start display) to which the display debugging information is input firstly when a debugging operation is carried out, and for example, the first debugging connection position parameter may generally correspond to the display position parameter (e.g., in the form of coordinates) preset for the start display, and the second debugging connection position parameter may generally correspond to the display position serial number set for the start display. The debugging display parameter represents a display parameter needing to be adjusted of a specified display.

It should be noted that, detailed description of the display control information may be referred to the foregoing description of the embodiments of the configuration method.

To better explain the control method for the display server and the configuration method for the spliced display device which are provided by the foregoing embodiments, an exemplary embodiment will be described below, and the exemplary embodiment gives a preset protocol format as an example, as shown in Table 1.

TABLE 1

| Byte numbering | | bit 7 | bit 6 | bit 5 | bit 4 | bit 3 | bit 2 | bit 1 | bit 0 |
|---|---|---|---|---|---|---|---|---|---|
| 1 | Function identification byte | Rsvd | Rsvd | Rsvd | Rsvd | Debug1 | debug | position | Power |
| 2 | The number M of columns of an array of the displays | | | | | | | | |
| 3 | The number N of rows of the array of the displays | | | | | | | | |
| 4 | Connection horizontal start position value AH | | | | | | | | |
| 5 | Connection vertical start position value AV | | | | | | | | |
| 6 | High-order bit(s) of debugging position value P (H)/Horizontal value of debugging position value PH Low-order bit(s) of debugging position value P (L)/Vertical value of debugging position value PV | | | | | | | | |
| 7 | R gain value Reserved (greater than 8 bits of data transmission) | | | | | | | | |
| 8 | R offset value Reserved (greater than 8 bits of data transmission) | | | | | | | | |
| 9 | G gain value Reserved (greater than 8 bits of data transmission) | | | | | | | | |
| 10 | G offset value Reserved (greater than 8 bits of data transmission) | | | | | | | | |
| 11 | B gain value Reserved (greater than 8 bits of data transmission) | | | | | | | | |
| 12 | B offset value Reserved (greater than 8 bits of data transmission) | | | | | | | | |
| 13 | Brightness adjustment digit(s) Reserved (greater than 8 bits of data transmission) | | | | | | | | |
| 14 | Contrast adjustment digit(s) Reserved (greater than 8 bits of data transmission) | | | | | | | | |
| 15 | Saturation adjustment digit(s) Reserved (greater than 8 bits of data transmission) | | | | | | | | |
| 16 | Reserved | | | | | | | | |

In Table 1, the leftmost column indicates that the preset protocol format includes 16 bytes Byte1 to Byte16, and the uppermost row indicates that a certain byte of the preset protocol format includes 8 bits bit0 to bit7 (in order from a low-order bit to a high-order bit). In the second row of Table 1, "Rsvd" represents a reserved bit, "Debug1" may represent the second debugging position parameter, "debug" may represent the first debugging position parameter, "position" may represent transmission of a display position, and "Power" may represent the first function identification parameter (which includes the turn-on control identifier and the display position transmission function execution identifier). For example, according to the requirement of a practical application, the number of rows and the number of columns of the displays to be spliced to form a spliced display device may be 3 and 5, respectively, the plurality of displays may be predetermined to be cascaded in the front-view normal Z-type cascade mode, and a connection row coordinate value AH of a start display may be 1 and a connection column coordinate value AV may be 1 according to the predetermined cascade mode. Based on the above-determined information, the first function identification parameter, the splicing number parameter and the connection position parameter may be set, and the position setting information may be generated according to the preset protocol format, as follows:

bit1 of Byte1 is set to be 1, and bit0 of Byte1 is set to be 1 being turned on, transmission of a position;

Byte2 is set to be 00000101—of the splicing number parameter, the number of columns of the array of displays included in the spliced display device is 5;

Byte3 is set to be 00000011—of the splicing number parameter, the number of rows of the array of displays included in the spliced display device is 3;

Byte4 is set to be 00000001—the connection row coordinate value AH of the start display is 1;

1Byte5 is set to be 00000001—the connection row coordinate value AV of the start display is 1;

Byte6 to Byte16 each are set to be 00000000—these bytes are ignored because no debugging operation is performed when a display position is set.

It can be seen that, in the position setting information, Byte1 may represent the first function identification parameter, Byte2 to Byte3 may represent the splicing number parameter, and Byte4 to Byte5 may represent the connection position parameter.

After the position setting information is generated, the position setting information may be transmitted to the spliced display device according to a fixed communication mode, and the spliced display device decodes the position setting information after receiving the position setting information to obtain the first function identification parameter, the splicing number parameter and the connection position parameter. The spliced display device may control the start display to be turned on and start to execute a display position transmission function, according to the first function identification parameter and the connection position parameter; may determine and store the boundary parameter and the display scaling parameter of the array of the plurality of displays according to the splicing number parameter; may store the connection position parameter as the preset display position information of the start display;

may determine and store a display start position and a display end position of a display picture to be displayed by the start display, according to the connection position parameter; and may control the start display to display the corresponding display picture according to the display start position and the display end position of the display picture to be displayed by the start display.

After the display position of the start display is set, the connection position parameter corresponding to the start display may be modified to obtain a next connection position parameter, and the next connection position parameter obtained by the modifying, the first function identification parameter and the splicing number parameter together are transmitted to the next display as a next position setting information.

For example, the next position setting information may be set as follows:
  bit1 of Byte1 is set to be 1, and bit0 of Byte1 is set to be 1 being turned on, transmission of a position;
  Byte2 is set to be 00000101—of the splicing number parameter, the number of columns of the array of displays included in the spliced display device is 5;
  Byte3 is set to be 00000011—of the splicing number parameter, the number of rows of the array of displays included in the spliced display device is 3;
  Byte4 is set to be 00000001—the connection row coordinate value AH of the next display is 2, i.e., the connection row coordinate value of the start display plus 1;
  Byte5 is set to be 00000001—the connection row coordinate value AV of the next display is 1;
  Byte6 to Byte 16 each are set to be 00000000—these bytes are ignored because no debugging operation is performed when a display position is set.

In the next position setting information, Byte1 may represent the first function identification parameter, Byte2 to Byte3 may represent the splicing number parameter, and Byte4 to Byte5 may represent the next connection position parameter.

Upon receiving the next position setting information, the next display may be controlled to be turned on and start to execute a display position transmission function, according to the first function identification parameter and the next connection position parameter; may store the next connection position parameter as the preset display position information of the next display; may determine and store a display start position and a display end position of a display picture to be displayed by the next display, according to the next connection position parameter; and may control the next display to display the corresponding display picture according to the display start position and the display end position of the display picture to be displayed by the next display. After the display position of the next display is set, this process may be repeated in the same way until display positions of all the displays of the spliced display device are set.

In an embodiment, as an example, the display debugging information may be generated according to the second function identification parameter, the first debugging position parameter, the debugging display parameter, and the first debugging connection position parameter.

In this case, the display server sets the second function identification parameter, the first debugging position parameter, the debugging display parameter, and the first debugging connection position parameter, and generates the display debugging information according to the preset protocol format as follows:
  bit2 of Byte1 is set to be 1—picture quality adjustment;
  bit3 of Byte1 is set to be 1 or 0-1: collaborative display; 0: separate display;
  Byte2 is set to be 00000101—of the splicing number parameter, the number of columns of the array of displays included in the spliced display device is 5;
  Byte3 is set to be 00000011—of the splicing number parameter, the number of rows of the array of displays included in the spliced display device is 3;
  Byte4 is set to be 00000001—a connection horizontal coordinate value (i.e. a column serial number) of the first debugging connection position parameter;
  Byte5 is set to be 00000001—a connection vertical coordinate value row serial number) of the first debugging connection position parameter;
  Byte6 is set to be: a position parameter of a specified display to be debugged;
  Byte7 is set to be: a gain of red pixels to be set and adjusted;
  Byte8 is set to be: an offset of red pixels to be set and adjusted;
  Byte9 is set to be: a gain of green pixels to be set and adjusted;
  Byte10 is set to be: an offset of green pixels to be set and adjusted;
  Byte11 is set to be: a gain of blue pixels to be set and adjusted;
  Byte12 is set to be: an offset of blue pixels to be set and adjusted;
  Byte 13 is set to be: a value of brightness to be set;
  Byte14 is set to be: a value of contrast to be set;
  Byte15 is set to be: an adjustment value of color saturation to be set.

It can be seen that in the above example, of the display debugging information, Byte1 represents the second function identification parameter, Byte2 to Byte3 represent the splicing number parameter, Byte4 to Byte5 represent the first debugging connection position parameter, Byte6 represents the first debugging position parameter, and Byte7 to Byte 15 represent the debugging display parameter.

It should be noted that, the splicing number parameter (Byte2 to Byte3) may be selected and set as corresponding values according to actual requirements and then may be transmitted, or may be ignored. The first debugging position parameter may be set as position coordinates of the display to be debugged, i.e., may include a debugging position horizontal value PH and a debugging position vertical value PV.

In an embodiment, as an example, the display debugging information is generated according to the second function identification parameter, the second debugging position parameter, the debugging display parameter, and the second debugging connection position parameter.

In this case, the display server sets the second function identification parameter, the second debugging position parameter, the debugging display parameter, and the second debugging connection position parameter, and generates the display debugging information according to the preset protocol format as follows:

bit2 of Byte1 is set to be 1—picture quality adjustment;
bit3 of Byte1 is set to be 1 or 0-1: collaborative display; 0: separate display;
Byte2 is set to be 00000101—of the splicing number parameter, the number of columns of the array of displays included in the spliced display device is 5;
Byte3 is set to be 00000011—of the splicing number parameter, the number of rows of the array of displays included in the spliced display device is 3;
Byte4 is set to be 00000000—high-order 8 bits of a display position serial number of the second debugging connection position parameter;
Byte5 is set to be 00000001—low-order 8 bits of the display position serial number of the second debugging connection position parameter;
Byte6 is set to be: a position parameter of a specified display to be debugged;
Byte7 is set to be: a gain of red pixels to be set and adjusted;
Byte8 is set to be: an offset of red pixels to be set and adjusted;
Byte9 is set to be: a gain of green pixels to be set and adjusted;
Byte10 is set to be: an offset of green pixels to be set and adjusted;
Byte11 is set to be: a gain of blue pixels to be set and adjusted;
Byte12 is set to be: an offset of blue pixels to be set and adjusted;
Byte13 is set to be: a value of brightness to be set;
Byte14 is set to be: a value of contrast to be set;
Byte15 is set to be: an adjustment value of color saturation to be set.

It can be seen that in the above example, of the display debugging information, Byte1 represents the second function identification parameter, Byte2 to Byte3 represent the splicing number parameter, Byte4 to Byte5 represent the second debugging connection position parameter, Byte6 represents the second debugging position parameter, and Byte7 to Byte 15 represent the debugging display parameter.

It should be noted that, the second debugging position parameter may be selected as a display position serial number of a display to be debugged, and in a case where the second debugging position parameter is the display position serial number of the display to be debugged, the second debugging position parameter may include: high-order bits P (H) and low-order bits P (L) of a debugging position value, i.e., the high-order 8 bits and the low-order 8 bits of the display position serial number of the display to be debugged.

The display position serial number of the display to be debugged may be determined in various ways, such as by way of a lookup table, by way of calculating according to a formula, or by other ways.

Taking determination of the second debugging position parameter of the specified display by way of a lookup table as an example, the plurality of displays of the spliced display device are cascaded in the front-view normal Z-type cascade mode shown in FIG. 6, i.e., the plurality of displays are distributed as the following table. For example, by way of the lookup table, the second debugging position parameter of the specified display of the spliced display device may be determined as M.

The distribution of the plurality of displays is as follows:

| 1 | 2 | ... | M − 1 | M |
|---|---|---|---|---|
| 2M | ... | ... | M + 2 | M + 1 |
| 2M + 1 | ... | ... | ... | 3M |
| ... | ... | ... | ... | ... |
| ... | ... | ... | NM − 1 | NM |

Taking determining the second debugging position parameter A(I, J) of the specified display according to a formula as an example, the formula may be as follows:

A(I, J)=J+M(I−1), where I is an odd number;
A(I, J)=M−J+1+M(I−1), where I is an even number;

where I is a row coordinate value (i.e. a row serial number) of the specified display, J is a column coordinate value (i.e. a column serial number) of the specified display. Taking the row coordinate value of the specified display of 1 and the column coordinate value of M as an example, substituting these two values for I and J in the above formula results in that A(I, J) is equal to M. That is, it is determined that the second debugging position parameter of the specified display is M.

After the display debugging information is generated, the display debugging information may be transmitted to the spliced display device in a fixed communication mode.

Figure 14:
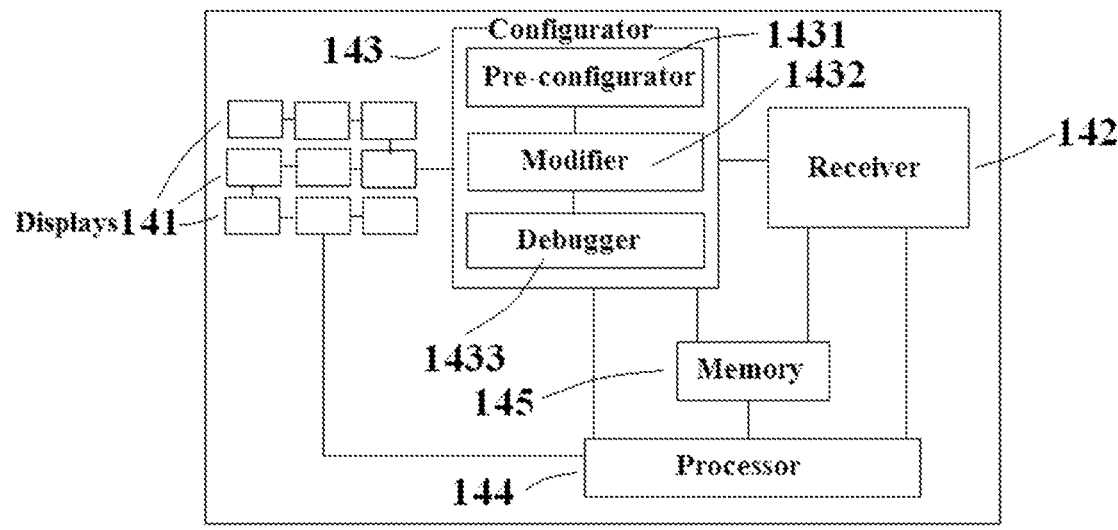
FIG. 14 is a schematic diagram showing a structure of a spliced display device according to an embodiment of the present disclosure.

An embodiment of the present disclosure provides a spliced display device, as shown in FIG. 14. The spliced display device may implement the configuration method provided by any one of the foregoing embodiments, and the spliced display device includes a plurality of displays 141 spliced together. Further, the spliced display device may further include a receiver 142 and a configurator 143.

The receiver 142 may receive the display control information sent by a display server in the preset protocol format, and the display control information at least includes position setting information.

The configurator 143 may configure the plurality of displays according to the display control information. For example, the configurator 143 may be connected to the plurality of displays 141 and the receiver 142, respectively.

In the spliced display device provided by the embodiment of the present disclosure, the receiver 142 can receive the display control information sent by the display server in the preset protocol format, and the display control information includes at least the position setting information. The configurator 143 can configure the plurality of displays 141 included in the spliced display device according to the display control information, and this configuring process includes at least setting positions of the plurality of displays 141. Therefore, the spliced display device provided by the embodiment of the present disclosure can perform the configuration operation conveniently and quickly, and thus can save manpower effectively.

In an embodiment, the configurator 143 includes a pre-configurator 1431 and a modifier 1432.

The pre-configurator 1431 may set a display position of the start display 141 of the plurality of displays 141 according to the position setting information.

The modifier 1432 may modify the position setting information, and transmit a next position setting information obtained by the modifying to a next display 141.

The pre-configurator 1431 may further set a display position of the next display 141 according to the next position setting information, and may repeat this process until a display position of the last display 141 of the spliced display device is set. In other words, the pre-configurator 1431 may set a display position of a specified display 141 of the plurality of displays 141 according to the position setting information. The modifier 1432 may modify the position setting information, and transmit a next position setting information obtained by the modifying to a next display 141.

In the spliced display device provided by the above embodiment of the present disclosure, after the receiver 142 receives the display control information sent by a server, the pre-configurator 1431 may first set a display position of the start display 141 of the spliced display device according to the position setting information of the display control information, then modify the position setting information to obtain a next position setting information, transmit the next position setting information to a next display 141, set a display position of the next display 141 according to the next position setting information, and repeat this process until display positions of all displays 141 of the spliced display device are set. Thus, the spliced display device according to the foregoing embodiment of the present disclosure can realize a full automatic function of configuring the displays 141 of the spliced display device, and thus can set up and debug the spliced display device conveniently and quickly with saving manpower compared with a method for setting up and debugging a spliced display device in the related art.

In an embodiment, the position setting information at least includes a first function identification parameter, a splicing number parameter, and a connection position parameter.

In this case, the pre-configurator 1431 provided by the foregoing embodiment of the present disclosure may control the start display 141 to be turned on and execute a display position transmission function, according to the first function identification parameter and the connection position parameter; determine and store a boundary parameter and a display scaling parameter of the array of the plurality of displays 141, according to the splicing number parameter; store the connection position parameter as a preset display position information of the start display; determine and store a display start position and a display end position of a display picture to be displayed by the start display, according to the connection position parameter; and control the start display to display the corresponding display picture according to the display start position and the display end position of the display picture to be displayed by the start display.

Further, the modifier 1432 provided by the foregoing embodiment of the present disclosure may modify the connection position parameter to obtain a next connection position parameter, and the next position setting information includes the first function identification parameter, the splicing number parameter, and a next connection position parameter.

In addition, the pre-configurator 1431 provided by the foregoing embodiment of the present disclosure may further controlling the next display 141 to be turned on and start to execute a display position transmission function, according to the first function identification parameter and the next connection position parameter; store the next connection position parameter as a preset display position information of the next display; determine and store a display start position and a display end position of a display picture to be displayed by the next display 141, according to the next connection position parameter; and control the next display 141 to display the corresponding display picture according to the display start position and the display end position of the display picture to be displayed by the next display 141.

In the spliced display device provided by the foregoing embodiment of the present disclosure, the pre-configurator 1431 can first control the start display 141 of the spliced display device to be turned on and set a position of the start display 141, then control a second display 141 next to the start display 141 to be turned on and set a position of the second display 141, and repeat this process until display positions of all the displays 141 are set. Thus, the spliced display device provided by the foregoing embodiment can conveniently and quickly set a display position of each of the displays, and can control the displays of the spliced display device to be turned on in the order in which the displays are cascaded, thereby reducing a surge and an interference to a power grid, and avoiding the influence on a public network.

In an embodiment, the modifier 1432 may be configured to: modify the connection position parameters to obtain a to-be-determined parameter;

perform a boundary determination on the to-be-determined parameter according to the boundary parameter of the array of the plurality of displays 141;

in a case where the to-be-determined parameter is within the range of the boundary parameter, take the to-be-determined parameter as a next connection position parameter; and in a case where the to-be-determined parameter is not within the range of the boundary parameter, remodify the connection position parameter again to obtain a to-be-determined parameter in the range of the boundary parameter, and take the to-be-determined parameter obtained by the remodifying as a next connection position parameter.

In an embodiment, the connection position parameter includes a connection row coordinate value (i.e., a row serial number of the array of the plurality of displays) and a connection column coordinate value(i.e., a column serial number of the array of the plurality of displays), and the boundary parameter includes a boundary row coordinate range and a boundary column coordinate range.

In this case, the modifier 1432 may be configured to:

add one (1) to one of the connection row coordinate value and the connection column coordinate value, or subtract one (1) from one of the connection row coordinate value and the connection column coordinate value, to obtain a to-be-determined row coordinate value and a to-be-determined column coordinate value;

compare the to-be-determined row coordinate value with the boundary row coordinate range, and compare the to-be-determined column coordinate value with the boundary column coordinate range; in a case where the to-be-determined row coordinate value is within the boundary row coordinate range and the to-be-determined column coordinate value is within the boundary column coordinate range, determine the to-be-determined row coordinate value and the to-be-determined column coordinate value as a next connection position parameter; and in a case where the to-be-determined row coordinate value is not within the boundary row coordinate range and/or the to-be-determined column coordinate value is not within the boundary column coordinate range, add one (1) to the other of the connection row coordinate value and the connection column coordinate value or subtract one (1) from the other of the connection row coordinate value and the connection column coordinate value, to obtain a to-be-determined row coordinate value within the boundary row coordinate range and a to-be-determined column coordinate value within the boundary column coordinate range, and take the to-be-determined row coordinate value and the to-be-determined column coordinate value, which are obtained by the remodifying, as a next connection position parameter.

In an embodiment, the display control information further includes display debugging information, and the configurator 143 further includes a debugger 1433.

The debugger 1433 may perform display parameter debugging on a specified display of the plurality of displays 141 according to the display debugging information and the preset display position information of the displays 141.

In the spliced display device provided by the foregoing embodiment of the present disclosure, by receiving the display debugging information, and performing display parameter debugging on a specified display 141 of the plurality of displays 141 according to the display debugging information and the preset display position information of the displays 141, it is possible to perform display parameter debugging on each of the displays according to actual requirements, such that display parameters corresponding to adjacent ones of the displays are close to each other, thereby achieving consistent display brightness and consistent color of the spliced display device, and ensuring that the spliced display device has a better display effect. Further, this method for performing display parameter debugging on each of the displays 141 is more convenient and faster, and the debugging of the spliced display device is more efficient.

In an embodiment, the display debugging information at least includes the second function identification parameter, the first debugging position parameter, the debugging display parameter, and the first debugging connection position parameter. The preset display position information includes at least the display position parameter.

In this case, the debugger 1433 may transmit the display debugging information to the start display 141 of the plurality of displays 141 according to the first debugging connection position parameter; determine a display mode of the start display 141 to be collaborative display or separate display and start to execute a display parameter debugging function, according to the second function identification parameter; compare the first debugging position parameter with the preset display position parameter of the start display 141; in a case where the first debugging position parameter is the same as the preset display position parameter of the start display, determine the start display 141 as a specified display 141; in a case where the first debugging position parameter is different from the preset display position parameter of the start display 141, modify the first debugging connection position parameter to obtain a next first debugging connection position parameter; transmit the display debugging information to a next display 141 next to the start display 141 according to the next first debugging connection position parameter; compare the first debugging position parameter with a preset display position parameter of the next display 141, repeat this process until a display 141 of which a preset display position parameter is the same as the first debugging position parameter is found, and determine the display 141 of which a preset display position parameter is the same as the first debugging position parameter as a specified display; and debug the specified display 141 of the plurality of displays 141 according to the debugging display parameter.

In an embodiment, the debugger 1433 may further determine a display position serial number corresponding to each of the displays 141 according to the preset display position information of the display 141.

The display debugging information may alternatively include at least the second function identification parameter, the second debugging position parameter, the debugging display parameter, and the second debugging connection position parameter.

In this case, the debugger 1433 may transmit the display debugging information to the start display 141 of the plurality of displays 141 according to the second debugging connection position parameter; determine a display mode of the start display 141 to be collaborative display or separate display and start to execute a display parameter debugging function, according to the second function identification parameter; compare the second debugging position parameter with the display position serial number corresponding to the start display 141; in a case where the second debugging position parameter is the same as the display position serial number corresponding to the start display 141, determine the start display 141 as a specified display 141; in a case where the second debugging position parameter is different from the display position serial number corresponding to the start display 141, modify the second debugging connection position parameter to obtain a next second debugging connection position parameter; transmit the display debugging information to a next display 141 next to the start display 141 according to the next second debugging connection position parameter; compare the second debugging position parameter with the display position serial number corresponding to the next display 141, repeat this process until a display 141 of which a display position serial number is the same as the second debugging position parameter is found, and determine the display 141 of which a display position serial number is the same as the second debugging position parameter as a specified display 141; and debug the specified display 141 of the plurality of displays 141 according to the debugging display parameter.

In an embodiment, the debugging display parameter includes a display brightness parameter, a display contrast parameter, a display color saturation parameter, and a gain parameter and an offset parameter of pixels included in a specified display 141.

In this case, the debugger 1433 may be configured to:

debug a specified display 141 of the plurality of displays 141 according to the debugging display parameter, and this debugging may include:

adjusting a display brightness of the specified display 141 according to the display brightness parameter;

adjusting a display contrast of the specified display 141 according to the display contrast parameter;

adjusting a display color saturation of the specified display 141 according to the display color saturation parameter;

adjusting a gain of the pixels included in the specified display 141 according to the gain parameter of the pixels included in the specified display 141: and adjusting an offset of the pixels included in the specified display 141 according to the offset parameter of the pixels included in the specified display 141.

It should be noted that, the functional components of the spliced display device provided by the foregoing embodiment of the present disclosure may implement the configuration method provided by any one of the foregoing embodiments of the present disclosure, and therefore, operations of the functional components of the spliced display device provided by the embodiment of the present disclosure may be further referred to the foregoing description, and detailed description thereof is omitted here.

Figure 15:
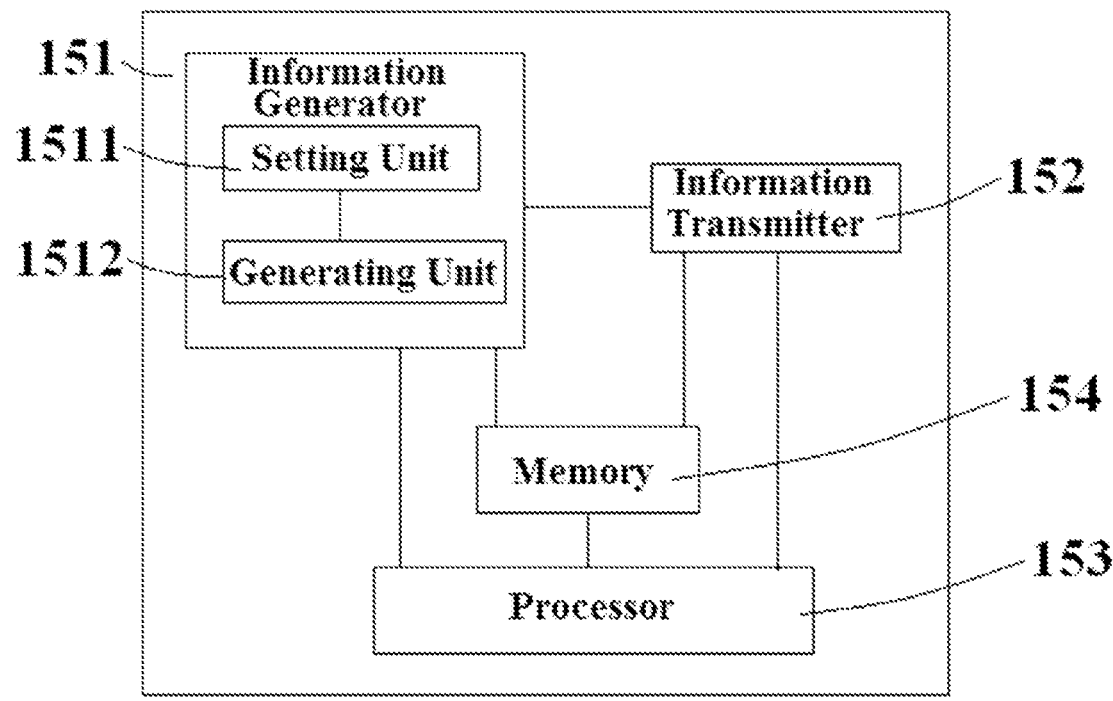
FIG. 15 is a schematic diagram showing a structure of a display server according to an embodiment of the present disclosure.

An embodiment of the present disclosure provides a display server, as shown in FIG. 15. The display server may include an information generator 151 and an information transmitter 152.

The information generator 151 may generate the display control information in the preset protocol format, and the display control information includes at least the position setting information.

The information transmitter 152 may transmit the display control information to the spliced display device.

In the display server provided by the embodiment of the present disclosure, the information generator may generate the display control information in the preset protocol format, and the information transmitter may transmit the display control information to the spliced display device. After receiving the display control information, the spliced display device may configure the plurality of displays 141 included in the spliced display device according to the display control information. Further, since the display control information at least includes the position setting information, the spliced display device can set positions of the plurality of displays 141 according to the position setting information. Thus, the display server provided by the embodiment of the present disclosure can send the display control information to the spliced display device in the preset protocol format, such that the spliced display device can perform convenient and efficient configuration on the displays 141 according to the preset protocol format.

In an embodiment, the information generator 151 provided by the foregoing embodiment of the present disclosure includes a setting unit 1511 and a generating unit 1512.

The setting unit 1511 may set the first function identification parameter, the splicing number parameter, and the connection position parameter.

The generating unit 1512 may generate the position setting information according to the first function identification parameter, the splicing number parameter, and the connection position parameter.

In an embodiment, the display control information provided by the foregoing embodiments further includes the display debugging information. The setting unit 1511 may further set the second function identification parameter, the first debugging position parameter, the debugging display parameter, and the first debugging connection position parameter. The generating unit 1512 may further generate the display debugging information according to the second function identification parameter, the first debugging position parameter, the debugging display parameter, and the first debugging connection position parameter.

In an embodiment, the display control information provided by the foregoing embodiments further includes the display debugging information. The setting unit 1511 may alternatively further set the second function identification parameter, the second debugging position parameter, the debugging display parameter, and the second debugging connection position parameter. The generating unit 1512 may alternatively further generate the display debugging information according to the second function identification parameter, the second debugging position parameter, the debugging display parameter, and the second debugging connection position parameter.

It is to be noted that, the functional components of the display server provided by the embodiment of the present disclosure may implement the control method provided by the foregoing embodiments of the present disclosure, and therefore, the operations of the functional components of the display server provided by the embodiment of the present disclosure may be further referred to the foregoing description, and detailed description thereof is omitted here.

An embodiment of the present disclosure provides a spliced display device, as shown in FIG. 14. The spliced display device may include a processor (e.g., a central processing unit CPU, a microprocessor, etc.) 144, a memory 145, and a computer program stored in the memory 145 and executable by the processor 144, and the computer program when being executed by the processor 144 implements the configuration method provided by the foregoing embodiments of the present disclosure. Specifically, the processor 144 is connected to the memory 145, and the processor 144 calls the program stored in the memory 145 to execute the configuration method according to the foregoing method embodiments.

In more detail, the processor 144 may receive the display control information sent by the display server in the preset protocol format, the display control information at least including the position setting information; and the processor 144 may further configure the plurality of displays 141 according to the display control information.

The processor 144, when configuring the plurality of displays 141 according to the display control information, may set a display position of the start display 141 of the plurality of displays 141 according to the position setting information; modify the position setting information, and transmit a next position setting information obtained by the modifying to a next display; set a display position of the next display 141 according to the next position setting information, and repeat this process until a display position of the last display 141 of the spliced display device is set.

The position setting information at least includes the first function identification parameter, the splicing number parameter, and the connection position parameter. When the processor 144 sets a display position of the start display 141 of the plurality of displays 141 according to the position setting information, the processor 144 may control the start display 141 to be turned on and start to execute a display position transmission function, according to the first function identification parameter and the connection position parameter; determine and store a boundary parameter and a display scaling parameter of the array of the plurality of displays 141, according to the splicing number parameter; store the connection position parameter as the preset display position information of the start display 141; determine and store a display start position and a display end position of a display picture to be displayed by the start display 141, according to the connection position parameter; and control the start display to display the corresponding display picture, according to the display start position and the display end position of the display picture to be displayed by the start display 141.

When the processor 144 modifies the position setting information to obtain a next position setting information, the processor 144 may modify the connection position parameter to obtain a next connection position parameter, which includes the first function identification parameter, the splicing number parameter and a next connection position parameter.

When the processor 144 sets a display position of the next display 141 according to the next position setting information, the processor 144 may control the next display 141 to be turned on and start to execute a display position transmission function, according to the first function identification parameter and the next connection position parameter; store the next connection position parameter as the preset display position information of the next display 141; determine and store a display start position and a display end position of a display picture to be displayed by the next display 141, according to the next connection position parameter; and control the next display 141 to display the corresponding display picture, according to the display start position and the display end position of the display picture to be displayed by the next display 141.

When the processor 144 modifies the connection position parameter to obtain a next connection position parameter, the processor 144 may modify the connection position parameter to obtain a to-be-determined parameter; perform a boundary determination on the to-be-determined parameter, according to the boundary parameter of the array of the plurality of displays 141; in a case where the to-be-determined parameter is within the range of the boundary parameter, take the to-be-determined parameter as the next connection position parameter; and in a case where the to-be-determined parameter is not within the range of the boundary parameter, remodify the connection position parameter to obtain a to-be-determined parameter within the range of the boundary parameter, and take the to-be-determined parameter obtained by the remodifying as the next connection position parameter.

The connection position parameter may include a connection row coordinate value and a connection column coordinate value, and the boundary parameter may include a boundary row coordinate range and a boundary column coordinate range. When the processor 144 modifies the connection position parameter to obtain a to-be-determined parameter, the processor 144 may add one (1) to one of the connection row coordinate value and the connection column coordinate value, or subtract one (1) from one of the connection row coordinate value and the connection column coordinate value, to obtain a to-be-determined row coordinate value and a to-be-determined column coordinate value. When the processor 144 performs a boundary determination on the to-be-determined parameter according to the boundary parameter of the array of the plurality of displays 141, the processor 144 may compare the to-be-determined row coordinate value with the boundary row coordinate range and compare the to-be-determined column coordinate value with the boundary column coordinate range; in a case where the to-be-determined row coordinate value is within the boundary row coordinate range and the to-be-determined column coordinate value is within the boundary column coordinate range, determine the to-be-determined row coordinate value and the to-be-determined column coordinate value as the next connection position parameter; in a case where the to-be-determined row coordinate value is not within the boundary row coordinate range and/or the to-be-determined column coordinate value is not within the boundary column coordinate range, add one (1) to the other of the connection row coordinate value and the connection column coordinate value or subtract one 1) from the other of the connection row coordinate value and the connection column coordinate value, to obtain a to-be-determined row coordinate value within the boundary row coordinate range and a to-be-determined column coordinate value within the boundary column coordinate range, and take the to-be-determined row coordinate value and the to-be-determined column coordinate value, which are obtained by the remodifying, as a next connection position parameter.

The display control information may further include the display debugging information, and the processor 144 may further perform display parameter debugging on a specified display 141 of the plurality of displays 141 according to the display debugging information and the preset display position information of the displays 141.

The display debugging information may include at least the second function identification parameter, the first debugging position parameter, the debugging display parameter and the first debugging connection position parameter. The preset display position information at least includes the display position parameter. When the processor 144 performs display parameter debugging on a specified display 141 of the plurality of displays 141 according to the display debugging information and the preset display position information of the displays, the processor 144 may transmit the display debugging information to the start display 141 of the plurality of displays 141 according to the first debugging connection position parameter; determine a display mode of the start display 141 to be collaborative display or separate display and start to execute a display parameter debugging function, according to the second function identification parameter; compare the first debugging position parameter with the preset display position parameter of the start display 141; in a case where the first debugging position parameter is the same as the preset display position parameter of the start display 141, determine the start display 141 as the specified display 141; in a case where the first debugging position parameter is different from the preset display position parameter of the start display 141, modify the first debugging connection position parameter to obtain a next first debugging connection position parameter; transmit the display debugging information to a next display 141 next to the start display 141 according to the next first debugging connection position parameter; compare the first debugging position parameter with the preset display position parameter of the next display 141, repeat this process until a display 141 of which a preset display position parameter is the same as the first debugging position parameter is found, and determine the display 141 of which a preset display position parameter is the same as the first debugging position parameter as the specified display 141; and debug the specified display 141 of the plurality of displays 141 according to the debugging display parameter.

The processor 144 may alternatively further determine a display position serial number corresponding to each of the displays 141, according to the preset display position information of the displays 141; and the display debugging information may alternatively include at least the second function identification parameter, the second debugging position parameter, the debugging display parameter and the second debugging connection position parameter. When the processor 144 performs display parameter debugging on a specified display 141 of the plurality of displays 141 according to the display debugging information and the preset display position information of the displays 141, the processor 144 may transmit the display debugging information to the start display 141 of the plurality of displays 141 according to the second debugging connection position parameter; determine a display mode of the start display 141 to be collaborative display or separate display and start to execute a display parameter debugging function, according to the second function identification parameter; compare the second debugging position parameter with the display position serial number corresponding to the start display 141; in a case where the second debugging position parameter is the same as the display position serial number corresponding to the start display 141, determine the start display 141 as the specified display 141; in a case where the second debugging position parameter is different from the display position serial number corresponding to the start display 141, modify the second debugging connection position parameter to obtain a next second debugging connection position parameter; transmit the display debugging information to the next display 141 next to the start display 141 according to the next second debugging connection position parameter; compare the second debugging position parameter with the display position serial number corresponding to the next display 141, repeat this process until a display 141 of which a display position serial number is the same as the second debugging position parameter is found, and determine the display 141 of which a display position serial number is the same as the second debugging position parameter as the specified display 141; and debug the specified display 141 of the plurality of displays 141 according to the debugging display parameter.

The debugging display parameter may include a display brightness parameter, a display contrast parameter, a display color saturation parameter, and a gain parameter and an offset parameter of pixels included in a specified display 141. When the processor 144 debugs the specified display 141 of the plurality of displays 141 according to the debugging display parameter, the processor 144 may adjust a display brightness of the specified display 141 according to the display brightness parameter; adjust a display contrast of the specified display 141 according to the display contrast parameter; adjust a display color saturation of the specified display 141 according to the display color saturation parameter; adjust a gain of the pixels included in the specified display 141 according to the gain parameter of the pixels included in the specified display 141; and adjust an offset of the pixels included in the specified display 141 according to the offset parameter of the pixels included in the specified display 141.

An embodiment of the present disclosure provides a display server, as shown in FIG. 15. The display server may include a processor (e.g., a central processing unit CPU, a microprocessor, etc.) 153, a memory 154, and a computer program stored in the memory 154 and executable by the processor 153, and the computer program when executed by the processor 153 implements the control method provided by the foregoing embodiments. Specifically, the processor 153 is connected to the memory 154, and the processor 153 calls the program stored in the memory 154 to implement the control method according to the foregoing method embodiments.

In more detail, the processor 153 may generate the display control information in the preset protocol format, the display control information including at least the position setting information; and the processor 153 may transmit the display control information to the spliced display device.

When the processor 153 generates the display control information in the preset protocol format, the processor 153 may set the first function identification parameter, the splicing number parameter, and the connection position parameter; and may generate the position setting information according to the first function identification parameter, the splicing number parameter and the connection position parameter.

The display control information may further include the display debugging information. When the processor 153 generates the display control information in the preset protocol format, the processor 153 may further set the second function identification parameter, the first debugging position parameter, the debugging display parameter, and the first debugging connection position parameter; and may generate the display debugging information according to the second function identification parameter, the first debugging position parameter, the debugging display parameter and the first debugging connection position parameter.

The display control information may further include the display debugging information. When the processor 153 generates the display control information in the preset protocol format, the processor 153 may alternatively further set the second function identification parameter, the second debugging position parameter, the debugging display parameter, and the second debugging connection position parameter; and may generate the display debugging information according to the second function identification parameter, the second debugging position parameter, the debugging display parameter and the second debugging connection position parameter.

It should be noted that each of the processor 144 of the spliced display device and the processor 153 of the display server may be one processor, or may be a collective term for a plurality of processors. Each of the memory 145 of the spliced display device and the memory 154 of the display server may be either a volatile memory or a nonvolatile memory, or may include both a volatile memory and a nonvolatile memory. For example, the nonvolatile memory may be a read-only memory (ROM), a programmable ROM (PROM), an erasable PROM (EPROM), an electrically erasable EPROM (EEPROM), or a flash memory. The volatile memory may be a random access memory (RAM) which serves as an external cache. By way of example but not limitation, many forms of RAM may be adopted herein, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct memory bus random access memory (DRRAM). The memory 145 or 154 described in the present disclosure is intended to include, but not limited to, these and any other suitable types of memory.

An embodiment of the present disclosure provides a computer-readable storage medium having a computer program stored therein, and the computer program, when executed by a processor, implements the steps of the configuration method provided by the foregoing embodiments or implements the steps of the control method provided by the foregoing embodiments.

The computer-readable storage medium provided by the present embodiment stores a program implementing the configuration method provided by the foregoing embodiments or a program implementing the control method provided by the foregoing embodiments, and a specific type of the readable storage medium may be referred to the description of the memory of the foregoing embodiment of a computer device. In addition, the program stored in the computer readable storage medium and the specific steps that the processor executes the program may be referred to the description of the spliced display device and the display server as described above.

It should be noted that the embodiments described herein may be implemented by hardware, software, firmware, middleware, microcode, or any combination thereof. For implementation by hardware, a processing unit may be implemented as one or more application specific integrated circuits (ASICs), digital signal processors (DSPs), digital signal processing devices (DSPDs), programmable logic devices (PLDs), field programmable gate arrays (FPGAs), general purpose processors, controllers, micro-controllers, microprocessors, other electronic units configured to perform the functions described herein, or a combination thereof.

For implementation by software, the methods and devices described herein may be implemented with blocks (e.g., procedures, functions, etc.) with the functions described herein. Software codes may be stored in the memory and executed by the processor. The memory may be implemented inside or outside the processor.

The foregoing embodiments in this specification may be described in a progressive manner, with each embodiment focusing on differences from the other embodiments. The features of the various embodiments may be combined with each other.

As will be appreciated by one of ordinary skill in the art, each of the embodiments of the present disclosure may be provided as a method, a device, or a computer program product. Accordingly, each of the embodiments of the present disclosure may be in the form of an entire hardware embodiment, an entire software embodiment or an embodiment combining software and hardware. Further, each of the embodiments of the present disclosure may be in the form of a computer program product embodied on one or more computer-readable storage media (including, but not limited to, a disk storage, a CD-ROM, an optical storage, and/or the like) having computer-readable program code stored therein. While exemplary embodiments of the present disclosure have been described, additional variations and modifications may be made to these embodiments by one of ordinary skill in the art after knowing the basic inventive concepts disclosed herein. Therefore, it is intended that the appended claims are interpreted as including the exemplary embodiments and all such variations and modifications falling within the scope of the embodiments of the present disclosure.

It should be further noted that, herein, terms such as first and second and the like may be used solely for distinguishing one entity or operation from another entity or operation, without necessarily requiring or implying any actual relationship or order between these entities or operations. Also, the terms "comprise," "include," or any other variation thereof, are intended to cover a non-exclusive inclusion, such that a process, method, article, or terminal that contains a list of elements contains not only those elements but also other elements not expressly listed or inherent to such process, method, article, or terminal. Without further limitation, an element defined by the phrase "comprising a/an . . . " does not exclude the presence of other identical elements in a process, method, article, or terminal that contains the element.

It should be noted that, one of ordinary skill in the art will further appreciate that the illustrative blocks and steps of algorithm described in connection with the embodiments disclosed herein may be implemented as electronic hardware, computer software, or combination thereof, and that various illustrative components and steps have been described above generally in terms of their functions in order to clearly explain interchangeability of hardware and software. Whether such functions are implemented as hardware or software depends upon a particular application and design constraints imposed on the implementation. One or ordinary skill in the art may implement the described functions in various ways for each particular application, and such implementation should not be interpreted as going beyond the scope of the present disclosure.

In the foregoing description of embodiments, the particular features, structures, materials, or characteristics may be combined in any suitable manner in any one or more embodiments or examples.

The foregoing embodiments are merely exemplary embodiments of the present disclosure, and the scope of the present disclosure is not limited thereto. One of ordinary skill in the art may easily conceive of changes or substitutions within the technical scope of the present disclosure, and all such changes or substitutions should be regarded as falling within the scope of the present disclosure. Therefore, the scope of the present disclosure is the scope as defined by the appended claims.

What is claimed is:

1. A configuration method for a spliced display device, wherein the spliced display device comprises a plurality of displays spliced together in an array, and the configuration method comprises:
   receiving display control information sent by a display server in a preset protocol format, wherein the display control information at least comprises position setting information; and configuring the plurality of displays according to the display control information,
   wherein the configuring the plurality of displays according to the display control information comprises: setting s display position of a start display of the plurality of displays according to the position setting information; modifying the position setting information to obtain a next position setting information, and transmitting the next position setting information obtained by the modifying to a next display; and setting a display position of the next display according to the next position setting information, and
   wherein the configuring the plurality of displays according to the display control information further comprises:
   determining whether the next display is a last display; and
   in a case where it is determined that the next display is not the last display, performing the modifying the position setting information to obtain a next position setting information, and the transmitting the next position setting information obtained by modifying to a next display; and the setting a display position of the next display according to the next posit km setting information.

2. The configuration method according claim 1, wherein the display control information further comprises display debugging information,
   the configuring the plurality of displays according to the display control information further comprises:
   performing display parameter debugging on a specified display of the plurality of displays according to the display debugging information and preset display position information of the displays.

3. The configuration method according to claim 2, wherein the display debugging information at least comprises a second function identification parameter, a first debugging position parameter, a debugging display parameter and a first debugging connection position parameter; the preset display position information at least comprises a display position parameter;
   the performing display parameter debugging on a specified display of the plurality of displays according to the display debugging information and preset display position information of the displays comprises:

transmitting the display debugging information to the start display of the plurality of displays according to the first debugging connection position parameter;

determining a display mode of the start display to be collaborative display or separate display and starting to execute a display parameter debugging function, according to the second function identification parameter;

comparing the first debugging position parameter with a preset display position parameter of the start display; in a case where the first debugging position parameter is the same as the preset display position parameter of the start display, determining the start display as the specified display;

in a case where the first debugging position parameter is different from the preset display position parameter of the start display, modifying the first debugging connection position parameter to obtain a next first debugging connection position parameter;

transmitting the display debugging information to a next display next to the start display according to the next first debugging connection position parameter; comparing the first debugging position parameter with a preset display position parameter of the next display, repeating this process until a display of which a preset display position parameter is the same as the first debugging position parameter is found out, and determining the display of which a preset display position parameter is the same as the first debugging position parameter as the specified display; and debugging the specified display of the plurality of displays according to the debugging display parameter.

4. The configuration method according to claim 3, wherein the debugging display parameter comprise a display brightness parameter, a display contrast parameter, a display color saturation parameter, and a gain parameter and an offset parameter of pixels comprised in the specified display;

the debugging the specified display of the plurality of displays according to the debugging display parameter comprises:

adjusting a display brightness of the specified display according to the display brightness parameter;

adjusting a display contrast of the specified display according to the display contrast parameter;

adjusting a display color saturation of the specified display according to the display color saturation parameter;

adjusting a gain of the pixels comprised in the specified display according to the gain parameter of the pixels comprised in the specified display; and adjusting an offset of the pixels comprised in the specified display according to the offset parameter of the pixels comprised in the specified display.

5. The configuration method according to claim 2, further comprising determining a display position serial number corresponding to each of the displays according to the preset display position information of the displays;

the display debugging information at least comprises a second function identification parameter, a second debugging position parameter, a debugging display parameter and a second debugging connection position parameter;

the performing display parameter debugging on a specified display of the plurality of displays according to the display debugging information and preset display position information of the displays comprises:

transmitting the display debugging information to the start display of the plurality of displays according to the second debugging connection position parameter;

determining a display mode of the start display to be collaborative display or separate display and starting to execute a display parameter debugging function, according to the second function identification parameter;

comparing the second debugging position parameter with the display position serial number corresponding to the start display; in a case where the second debugging position parameter is the same as the display position serial number corresponding to the start display, determining the start display as the specified display;

in a case where the second debugging position parameter is different from the display position serial number corresponding to the start display, modifying the second debugging connection position parameter to obtain a next second debugging connection position parameter;

transmitting the display debugging information to a next display next to the start display according to the next second debugging connection position parameter; comparing the second debugging position parameter with the display position serial number corresponding to the next display, repeating this process until a display of which the display position serial number is the same as the second debugging position parameter is found out, and determining the display of which the display position serial number is the same as the second debugging position parameter as the specified display; and debugging the specified display of the plurality of displays according to the debugging display parameter.

6. The configuration method according to claim 5, wherein the debugging display parameter comprise a display brightness parameter, a display contrast parameter, a display color saturation parameter, and a gain parameter and an offset parameter of pixels comprised in the specified display;

the debugging the specified display of the plurality of displays according to the debugging display parameter comprises:

adjusting a display brightness of the specified display according to the display brightness parameter;

adjusting a display contrast of the specified display according to the display contrast parameter;

adjusting a display color saturation of the specified display according to the display color saturation parameter;

adjusting a gain of the pixels comprised in the specified display according to the gain parameter of the pixels comprised in the specified display; and adjusting an offset of the pixels comprised in the specified display according to the offset parameter of the pixels comprised in the specified display.

7. A spliced display device, comprising a processor, a memory, and a computer program stored in the memory and executable by the processor, wherein the computer program, when being executed by the processor, implements the configuration method according to claim 1.

8. A non-transitory computer-readable storage medium, comprising a computer program stored therein, wherein the computer program, when being executed by a processor, carries out steps of the configuration method according to claim 1.

9. A configuration method for a spliced display device, wherein the spliced display device comprises a plurality of displays spliced together in an array, and the configuration method comprises:

receiving display control information sent by a display server in a preset protocol format, wherein the display control information at least comprises position setting information; and configuring the plurality of displays according to the display control information, wherein the configuring the plurality of displays according to the display control information comprises: setting a display position of a start display of rise plurality of displays according to the position setting information; modifying the position setting information to obtain a next position setting information, and transmitting the next position setting information obtained by the modifying to a next display; and setting a display position of the next display according to the next position setting information, wherein the position setting information at least comprises a first function identification parameter, a splicing number parameter and a connection position parameter;

the setting a display position of a start display of the plurality of displays according to the position setting information comprises:

controlling the start display to be turned on and start to execute a display position transmission function, according to the first function identification parameter and the connection position parameter;

determining and storing a boundary parameter and a display scaling parameter of the array of the plurality of displays, according to the splicing number parameter;

storing the connection position parameter as a preset display position information of the start display;

determining and storing a display start position and a display end position of a display picture to be displayed by the start display, according to the connection position parameter; and controlling the start display to display the display picture, according to the display start position and the display end position of the display picture to be displayed by the start display.

10. The configuration method according to claim 9, wherein the modifying the position setting information to obtain a next position setting information comprises:

modifying the connection position parameter to obtain a next connection position parameter, wherein the next position setting information comprises the first function identification parameter, the splicing number parameter and the next connection position parameter;

the setting a display position of the next display according to the next position setting information comprises:

controlling the next display to be turned on and start to execute a display position transmission function, according to the first function identification parameter and the next connection position parameter;

storing the next connection position parameter as a preset display position information of the next display;

determining and storing a display start position and a display end position of a display picture to be displayed by the next display, according to the next connection position parameter; and controlling the next display to display the display picture, according to the display start position and the display end position of the display picture to be displayed by the next display.

11. The configuration method according to claim 10, wherein the modifying the connection position parameter to obtain a next connection position parameter comprises:

modifying the connection position parameter to obtain a to-be-determined parameter; performing a boundary determination on the to-be-determined parameter according to the boundary parameter of the array of the plurality of displays;

in a case where the to-be-determined parameter is within a range of the boundary parameter, taking the to-be-determined parameter as the next connection position parameter; and in a case where the to-be-determined parameter is not within the range of the boundary parameter, remodifying the connection position parameter to obtain a to-be-determined parameter within the range of the boundary parameter, and taking the to-be-determined parameter obtained by the remodifying as the next connection position parameter.

12. The configuration method according to claim 11, wherein the connection position parameter comprises a connection row coordinate value and a connection column coordinate value, and the boundary parameter comprises a boundary row coordinate range and a boundary column coordinate range;

the modifying the connection position parameter to obtain a to-be-determined parameter comprises:

adding 1 to one of the connection row coordinate value and the connection column coordinate value, or subtracting 1 from the one of the connection row coordinate value and the connection column coordinate value, to obtain a to-be-determined row coordinate value and a to-be-determined column coordinate value;

the performing a boundary determination on the to-be-determined parameter according to the boundary parameter of the array of the plurality of displays comprises:

comparing the to-be-determined row coordinate value with the boundary row coordinate range, and comparing the to-be-determined column coordinate value with the boundary column coordinate range; in a case where the to-be-determined row coordinate value is within the boundary row coordinate range and the to-be-determined column coordinate value is within the boundary column coordinate range, determining the to-be-determined row coordinate value and the to-be-determined column coordinate value as the next connection position parameter; and in a case where the to-be-determined row coordinate value is not within the boundary row coordinate range and/or the to-be-determined column coordinate value is not within the boundary column coordinate range, adding 1 to the other of the connection row coordinate value and the connection column coordinate value, or subtracting 1 from the other of the connection row coordinate value and the connection column coordinate value, to obtain a to-be-determined row coordinate value within the boundary row coordinate range and a to-be-determined column coordinate value within the boundary column coordinate range, and taking the to-be-determined row coordinate value and the to-be-determined column coordinate value, which are obtained by remodifying, as the next connection position parameter.

13. A spliced display device, comprising a processor, a memory, and a computer program stored in the memory and executable by the processor, wherein the computer program, when being executed by the processor, implements the configuration method according to claim 9.

14. A non-transitory computer-readable storage medium, comprising a computer program stored therein, wherein the computer program, when being executed by a processor, carries out steps of the configuration method according to claim 9.

15. A control method for a display server, the control method comprising:
- generating display control information in a preset protocol format, wherein the display control information at least comprises position setting information; and
- transmitting the display control information to a spliced display device,
- wherein the generating display control information in a preset protocol format comprises:
- setting a first function identification parameter, a splicing number parameter and a connection position parameter; and
- generating the position setting information according to the first function identification parameter, the splicing number parameter and the connection position parameter.

16. The control method according to claim 15, wherein the display control information further comprises display debugging information, and the generating display control information in a preset protocol format comprises:
- setting a second function identification parameter, a first debugging position parameter, a debugging display parameter and a first debugging connection position parameter which are comprised in the display debugging information; and generating the display debugging information according to the second function identification parameter, the first debugging position parameter, the debugging display parameter and the first debugging connection position parameter;

or

- setting a second function identification parameter, a second debugging position parameter, a debugging display parameter and a second debugging connection position parameter which are comprised in the display debugging information; and generating the display debugging information according to the second function identification parameter, the second debugging position parameter, the debugging display parameter and the second debugging connection position parameter.

17. A display server, comprising a processor, a memory, and a computer program stored in the memory and executable by the processor, wherein the computer program, when being executed by the processor, implements the control method according to claim 15.

* * * * *